US012335496B2

(12) United States Patent
Chujoh et al.

(10) Patent No.: US 12,335,496 B2
(45) **Date of Patent: *Jun. 17, 2025**

(54) METHOD AND ELECTRONIC DEVICE FOR SIGNALING GRADUAL DECODING REFRESH PICTURES

(71) Applicant: SHARP KABUSHIKI KAISHA, Sakai (JP)

(72) Inventors: Takeshi Chujoh, Sakai (JP); Yukinobu Yasugi, Sakai (JP); Eiichi Sasaki, Sakai (JP); Tomoko Aono, Sakai (JP); Tomohiro Ikai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,042

(22) Filed: Dec. 7, 2023

(65) Prior Publication Data

US 2024/0114155 A1 Apr. 4, 2024

Related U.S. Application Data

(63) Continuation of application No. 17/974,459, filed on Oct. 26, 2022, now Pat. No. 11,889,092, which is a (Continued)

(30) Foreign Application Priority Data

Aug. 29, 2018 (JP) ................................ 2018-160712

(51) Int. Cl.
*H04N 19/169* (2014.01)
*H04N 19/107* (2014.01)
(Continued)

(52) U.S. Cl.
CPC ......... *H04N 19/188* (2014.11); *H04N 19/107* (2014.11); *H04N 19/172* (2014.11); (Continued)

(58) Field of Classification Search
CPC .................................................... H04N 19/188
See application file for complete search history.

(56) References Cited

U.S. PATENT DOCUMENTS

2004/0066854 A1 4/2004 Hannuksela
2013/0114735 A1 5/2013 Wang
(Continued)

FOREIGN PATENT DOCUMENTS

CN 104160702 A 11/2014

OTHER PUBLICATIONS

"Series H: Audiovisual and Multimedia Systems Infrastructure of audiovisual services—Coding of moving video, Advanced video coding for generic audiovisual services", ITU-T H.264 (Apr. 2017).
(Continued)

*Primary Examiner* — Jerry T Jean Baptiste
(74) *Attorney, Agent, or Firm* — ScienBiziP, P.C.

(57) ABSTRACT

A method for signaling gradual refresh for encoding a set of pictures performed by an electronic device is provided. The method identifies a first picture in the set of pictures as being associated with a gradual refreshed picture, and stores a network abstraction layer (NAL) unit type in a coded stream associated with the first picture. The NAL unit type identifies a presence of the gradual refreshed picture. The method then stores, in the coded stream, an enable flag to identify a use of the gradual refresh for encoding at least a subset of pictures in the set of pictures.

20 Claims, 16 Drawing Sheets

Related U.S. Application Data continuation of application No. 17/271,201, filed as application No. PCT/JP2019/032910 on Aug. 22, 2019, now Pat. No. 11,539,968.

(51) Int. Cl.

| | |
|---|---|
| ***H04N 19/172*** | (2014.01) |
| ***H04N 19/70*** | (2014.01) |
| *H04N 19/167* | (2014.01) |
| *H04N 19/82* | (2014.01) |

(52) U.S. Cl.

CPC .......... *H04N 19/70* (2014.11); *H04N 19/167* (2014.11); *H04N 19/82* (2014.11)

(56) References Cited

U.S. PATENT DOCUMENTS

| | | | | |
|---|---|---|---|---|
| 2013/0294499 | A1* | 11/2013 | Wang | H04N 19/70 375/240.02 |
| 2014/0092963 | A1* | 4/2014 | Wang | H04N 19/70 375/240.12 |
| 2017/0347109 | A1* | 11/2017 | Hendry | H04N 19/188 |

OTHER PUBLICATIONS

"Series H: Audiovisual and Multimedia Systems Infrastructure of audiovisual services—Coding of moving video, High efficiency video coding", ITU-T H.265 (Feb. 2018).

* cited by examiner

| pic_parameter_set_rbsp( ) { | Descriptor |
|---|---|
| pps_pic_parameter_set_id | ue(v) |
| pps_seq_parameter_set_id | ue(v) |
| | |
| partial_region_mode | |
| if (partial_region_mode) { | |
| num_of_partial_region_minus1 | ue(v) |
| for (i=0 ; i<num_of_partial_region_minus1+1;i++) { | |
| position_ctu_adress[i] | ue(v) |
| region_ctu_width_minus1[i] | ue(v) |
| region_ctu_height_minus1[i] | ue(v) |
| } | |
| } | |
| | |
| } | |

| slice_segment_header( ) { | Descriptor |
|---|---|
| first_slice_segment_in_pic_flag | u(1) |
| | |
| if (first_slice_segment_in_pic_flag) { | |
| partial_region_mode | u(1) |
| if (partial_region_mode) { | |
| num_of_partial_region_minus1 | ue(v) |
| for (i=0 ; i<num_of_partial_region_minus1+1;i++) { | |
| position_ctu_adress[i] | ue(v) |
| region_ctu_width_minus1[i] | ue(v) |
| region_ctu_height_minus1[i] | ue(v) |
| } | |
| } | |
| } | |
| | |
| } | |

```
for(i=0;i<PicHeightInCtbsY-1;i++) {
  for(j=0;j<PicWidthInCtbsY-1;j++) {
    partial_region_map[i][j] = 0;
  }
}
if (partial_region_mode) {
   for (i=0 ; i<num_of_partial_region_minus1+1;i++) {
     x=position_ctu_adress[i]%PicWidthInCtbsY;
     y=position_ctu_adress[i]/PicWidthInCtbsY;
     for(j=0;i<region_ctu_width_minus1[i];j++) {
       for(k=0;k<region_ctu_height_minus1[i];k++) {
         partial_region_map[y+j][x+k] = 1;
       }
     }
   }
}
```

FIG. 11

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| ... | ... |
| seq_refresh_enable_flag | u(1) |
| if (seq_refresh_enable_flag) { | |
| seq_refresh_period | ue(v) |
| } | |
| vui_parameters_present_flag | u(1) |
| if( vui_parameters_present_flag ) | |
| vui_parameters( ) | |
| ... | |

GRADUAL REFRESH INFORMATION (seq_refresh_enable_flag through })

FIG. 13

METHOD AND ELECTRONIC DEVICE FOR SIGNALING GRADUAL DECODING REFRESH PICTURES

CROSS-REFERENCE TO RELATED APPLICATION(S)

This application is a continuation application of U.S. patent application Ser. No. 17/974,459, filed on Oct. 26, 2022, which is a continuation application of U.S. patent application Ser. No. 17/271,201, filed on Feb. 24, 2021, which is a national stage application of International Patent Application No. PCT/JP2019/032910, filed on Aug. 22, 2019, which claims the benefit of and priority to Japanese Patent Application Serial No. 2018-160712, filed on Aug. 29, 2018, the contents of all of which are hereby incorporated herein fully by reference in their entirety for all purposes.

TECHNICAL FIELD

Embodiments of the present invention relate to a video decoding apparatus and a video coding apparatus.

BACKGROUND ART

In order to efficiently transmit or record videos, video coding apparatuses that generate coded data by coding videos and video decoding apparatuses that generate decoded images by decoding the coded data are used.

Examples of specific video coding schemes include schemes proposed by H.264/Advanced Video Coding (AVC) and H.265/High-Efficiency Video Coding (HEVC).

In HEVC, a method of splitting pictures called tiles into rectangles has been introduced. The tiles are mainly for splitting screens and performing coding and decoding in parallel, and intra prediction, motion vector prediction, and entropy coding operate independently for each tile.

In addition, NPL 1 is exemplified as a recent technique for coding and decoding videos.

CITATION LIST

Non Patent Literature

NPL 1: "Algorithm Description of Joint Exploration Test Model 7," JVET-G1001, Joint Video Exploration Team (JVET) of ITU-T SG 16 WP 3 and ISO/IEC JTC 1/SC 29/WG 11, Aug. 19, 2017

NPL 2: "Improved Cyclic Intra Refresh," JVET-K0212, Joint Video Exploration Team (JVET) of ITU-T SG 16 WP 3 and ISO/IEC JTC1/SC 29/WG 11, Jul. 10, 2018

SUMMARY OF INVENTION

Technical Problem

In a tile, intra prediction and a motion vector in the same screen are restricted although inter prediction is not restricted.

In order to independently decode only a specific partial image region in the same screen, it is not possible to properly perform decoding if inter prediction processing referring to a region other than the partial image region is included. Thus, there is a method of restricting a direction of a motion vector on a coding side in the related art. However, according to recent schemes, such as HEVC, there is a method using a motion vector coded in the past, such as a merging mode, and there is a problem that it is difficult to explicitly restrict the motion vector and coding efficiency is significantly degraded.

Thus, the present invention was made in view of the aforementioned problem, and an object thereof is to provide a mechanism that realizes video coding and decoding such that only a specific portion on the same screen can be independently decoded.

Solution to Problem

In a first aspect of the present disclosure, a video decoding apparatus configures a partial image region in a picture that is a target of intra prediction, inter prediction, loop filter processing, or the like, handles a region outside the partial image region in a similar manner to a region outside the picture, and does not apply such limitation to a region other than the partial image region in the picture.

In a second aspect of the present disclosure, a method for signaling gradual refresh for encoding a set of pictures is provided. The method includes identifying a first picture in the set of pictures as being associated with a gradual refreshed picture; storing a network abstraction layer (NAL) unit type in a coded stream associated with the first picture, the NAL unit type identifying a presence of the gradual refreshed picture; and storing, in the coded stream, an enable flag to identify a use of the gradual refresh for encoding at least a subset of pictures in the set of pictures.

In a third aspect of the present disclosure, an electronic device for signaling gradual refresh for encoding a set of pictures is provided. The electronic device includes one or more processors, and one or more non-transitory machine-readable medium coupled to the one or more processors and storing one or more machine-executable instructions. The machine-executable instructions, when executed by at least one of the one or more processors, cause the electronic device to: identify a first picture in the set of pictures as being associated with a gradual refreshed picture; store a network abstraction layer (NAL) unit type in a coded stream associated with the first picture, the NAL unit type identifying a presence of the gradual refreshed picture; and store, in the coded stream, an enable flag to identify a use of the gradual refresh for encoding at least a subset of pictures in the set of pictures.

Advantageous Effects of Invention

According to an aspect of the present invention, it is possible to realize partial decoding in a picture by configuring a partial image region, in which prediction processing and loop filter processing are restricted, in the picture.

BRIEF DESCRIPTION OF DRAWINGS

FIG. 11 is a diagram illustrating a configuration of a partial image region map, in accordance with one or more example implementations of this disclosure.

FIG. 13 is a diagram illustrating a syntax necessary for the gradual refresh, in accordance with one or more example implementations of this disclosure.

DESCRIPTION OF EMBODIMENTS

First Embodiment

Hereinafter, the present embodiment of the present invention will be described with reference to the drawings.

Figure 18:
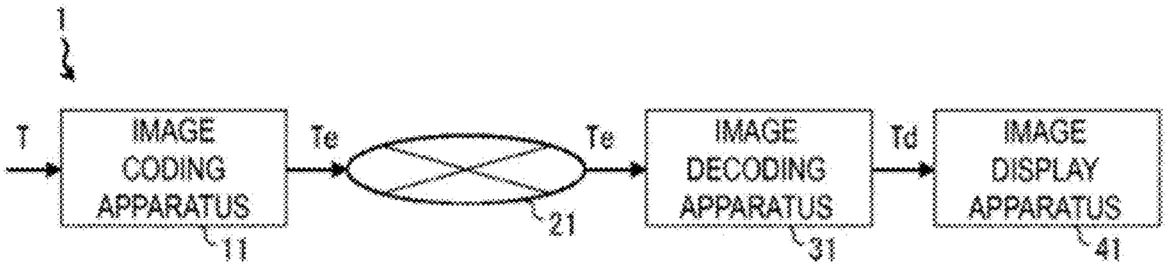
FIG. 18 is a schematic diagram illustrating a configuration of an image transmission system, in accordance with one or more example implementations of this disclosure.

FIG. 18 is a schematic diagram illustrating a configuration of an image transmission system 1, in accordance with one or more example implementations of this disclosure.

The image transmission system 1 is a system in which coded streams obtained by coded target images are transmitted, the transmitted coded streams are decoded, and thus images are displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coded stream Te generated by the video coding apparatus 11 to the video decoding apparatus 31. The network 21 may be the Internet, a wide area network (WAN), a local area network (LAN), or a combination thereof. The network 21 is not necessarily limited to a bidirectional communication network and may be a unidirectional communication network configured to transmit broadcast waves of digital terrestrial broadcasting, satellite broadcasting, or the like. The network 21 may be substituted by a storage medium in which the coded stream Te is recorded, such as a Digital Versatile Disc (DVD) or a Blue-ray Disc (BD).

The video decoding apparatus 31 decodes each coded stream Te transmitted through the network 21 and generates one or multiple decoded images Td.

The video display apparatus 41 displays all or some of the one or more decoded images Td generated by the video decoding apparatus 31. The video display apparatus 41 includes, for example, a display device, such as a liquid crystal display or an organic electro-luminescence (EL) display. Examples of forms of the display include a stationary form, a mobile form, an HMD form, and the like. Images with high image quality are displayed in a case that the video decoding apparatus 31 has a high processing capability, while images that do not require a high processing capability and a high display capability are displayed in a case that the video decoding apparatus 31 has only a low processing capability.

Operator

Operators used in the present specification will be described below.

- >> denotes a right bit shift, << denotes a left bit shift, & denotes a bitwise AND, | denotes a bitwise OR, |=denotes an OR assignment operator, and || denotes a logical sum.
- x?y:z is a ternary operator that is y in a case that x is true (other than 0) and is z in a case that x is false (0).
- Clip3(a, b, c) is a function that clips c in a value equal to or greater than a and equal to or less than b and a function that returns a in a case that c<a, returns b in a case that c>b, and returns c in other cases (provided that a<=b).
- abs(a) is a function that returns an absolute value of a.
- Int(a) is a function that returns an integer value of a.
- floor(a) is a function that returns a maximum integer that is equal to or less than a.
- ceil(a) is a function that returns a maximum integer that is equal to greater than a.
- a/d denotes division of a by d (rounded down to the nearest decimal point).

Structure of Coded Stream Te

Prior to detailed description of the video coding apparatus 11 and the video decoding apparatus 31, according to the present embodiment, a data structure of the coded stream Te generated by the video coding apparatus 11 and decoded by the video decoding apparatus 31 will be described.

Figure 1:
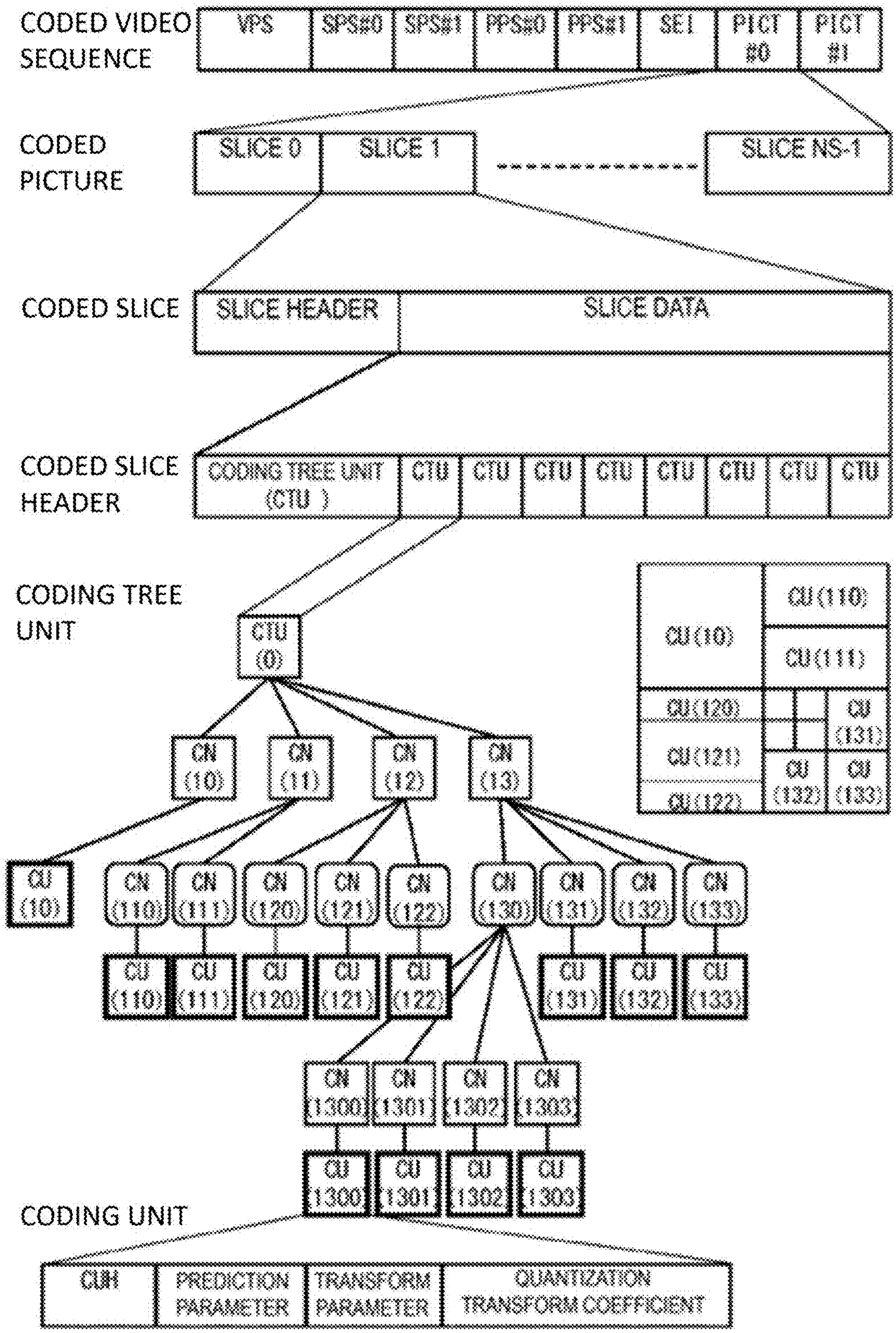
FIG. 1 is a diagram illustrating a hierarchical structure of data of a coded stream, in accordance with one or more example implementations of this disclosure.

FIG. 1 is a diagram illustrating a hierarchy structure of data a coded stream Te, in accordance with one or more example implementations of this disclosure. The coded stream Te includes a sequence and multiple pictures constituting the sequence in an illustrative example. FIG. 1 is the diagram illustrating a coded video sequence prescribing a sequence SEQ, a coded picture prescribing a picture PICT, a coded slice prescribing a slice S, coded slice data prescribing slice data, a coding tree unit included in the coded slice data, and coding units included in the coding tree unit, respectively.

Coding Video Sequence

In the coded video sequence, a set of data items referred to by the video decoding apparatus 31 to decode the sequence SEQ to be processed is defined. As illustrated in FIG. 1, the sequence SEQ may include a video parameter set, a sequence parameter set SPS, a picture parameter set PPS, a picture PICT, and supplemental enhancement information SEI.

In the video parameter set VPS, a set of coding parameters common to multiple videos and a set of coding parameters associated with multiple layers and individual layers included in the video are defined in a video constituted by multiple layers.

In the sequence parameter set SPS, a set of coding parameters referred to by the video decoding apparatus 31 to decode a target sequence is defined. For example, a width and a height of a picture are defined. Note that multiple SPSs may be present. In that case, any of the multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of weighted prediction are included. Note that multiple PPSs may be present. In that case, any of the multiple PPSs is selected from each picture in a target sequence.

Coding Picture

In the coded picture, a set of data items referred to by the video decoding apparatus 31 to decode a picture PICT to be processed is defined. As illustrated in FIG. 1, the picture PICT includes slices 0 to NS-1 (NS is the total number of slices included in the picture PICT).

Note that in a case that it is not necessary to distinguish each of the slices 0 to NS-1 below, subscripts of reference signs may be omitted. In addition, the same applies to other data with subscripts included in the coded stream Te which will be described below.

Coding Slice

In the coded slice, a set of data items referred to by the video decoding apparatus 31 to decode the slice S to be processed is defined. As illustrated in FIG. 1, the slice includes a slice header and slice data.

The slice header includes a coding parameter group referred to by the video decoding apparatus 31 to determine a method of decoding a target slice. Slice type specification information (slice type) specifying a slice type is one example of a coding parameter included in the slice header.

Examples of slice types that may be specified by the slice type specification information include (1) I slice using only intra prediction in coding, (2) P slice using a unidirectional prediction or intra prediction in coding, (3) B slice using unidirectional prediction, bidirectional prediction, or intra prediction in coding, and the like. Note that the inter prediction is not limited to uni-prediction and bi-prediction and a prediction image may be generated using more reference pictures. Hereinafter, slices called P and B slices indicate slices including blocks that may use inter prediction.

Note that the slice header may include reference (pic_parameter_set_id) to the picture parameter set PPS.

Coding Slice Data

In the coded slice data, a set of data items referred to by the video decoding apparatus 31 to decode the slice data to be processed is defined. The slice data includes a CTU as illustrated in FIG. 1. The CTU is a block with a fixed size (for example, 64×64) constituting a slice and may be called a largest coding unit (LCU).

Coding Tree Unit

In FIG. 1, a set of data items referred to by the video decoding apparatus 31 to decode the CTU to be processed is defined. FIGS. 2A-2F are diagrams respectively illustrating a CTU split example, in accordance with one or more example implementations of this disclosure. The CTU is split into coding unit CUs that are basic units of coding processing through recursive quad tree split (quad tree (QT) split, binary tree (BT) split) or ternary tree split (ternary tree (TT) split). The BT split and the TT split will collectively be referred to as multi-tree split (multi-tree (MT) split). Nodes with a tree structure obtained by recursive quad tree split will be referred to as coding nodes. Intermediate nodes of a quad tree, a binary tree, and a ternary tree are coding nodes, and the CTU itself is also defined as the highest coding node.

CT includes, as CT information, QT split flag (cu_split_flag) indicating whether or not to perform QT split, an MT split mode (split_mt_mode) indicating a splitting method for MT split, an MT split direction (split_mt_dir_indicating a splitting direction of MT split, and an MT split type (split_mt_type) indicating a split type of MT split. Cu_split_flag, split_mt_flag, split_mt_dir, and split_mt_type are transmitted for each coding node.

Figure 2A:
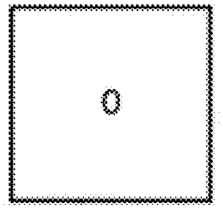
FIGS. 2A-2F are diagrams respectively illustrating a CTU split example, in accordance with one or more example implementations of this disclosure.
Figure 2B:
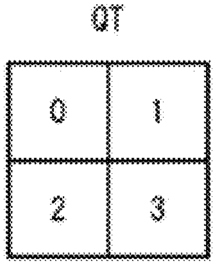

In a case that cu_split_flag is 1, the coding node is split into four coding nodes (FIG. 2B). In a case that cu_split_flag is 0, the coding node is not split and has one CU as a node in a case that split_mt_flag is 0 (FIG. 2A). The CU is an end node of the coding node and is not split any more. The CU is a basic unit of coding processing.

Figure 2C:
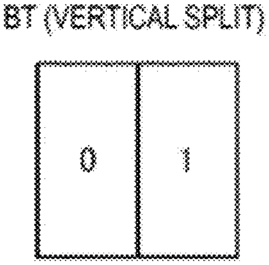
Figure 2D:
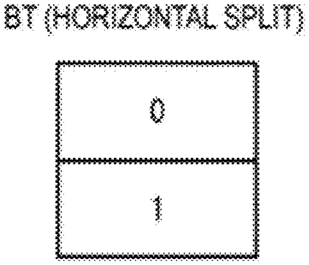
Figure 2E:
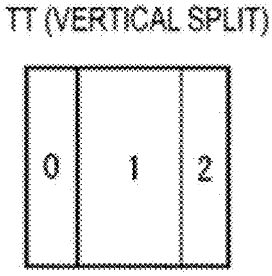
Figure 2F:
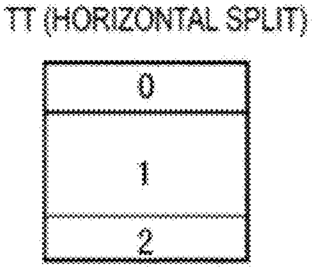

In a case that split_mt_flag is 1, the following MT split is performed on the coding node. In a case that the split_mt_type is 0, the coding node is horizontally split into two coding nodes in a case that split_mt_dir is 1 (FIG. 2D), and the coding node is vertically split into two coding nodes in a case that split_mt_dir is 0 (FIG. 2C). Also, in a case that the split_mt_type is 1, the coding node is horizontally split into three coding nodes in a case that split_mt_dir is 1(FIG. 2F), and the coding node is vertically split into three coding nodes in a case that split_mt_dir is 0 (FIG. 2E).

Also, in a case that the size of the CTU is 64×64 pixels, the size of the CU may be any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 1, a set of data items referred to by the video decoding apparatus 31 to decode the coding unit to be processed is defined. Specifically, the CU is constituted of a CU header CUH, a prediction parameter, a transform parameter, a quantization transform coefficient, and the like. In the CU header, a prediction mode and the like are defined.

The prediction processing may be performed in units of Cus and in units of sub-Cus obtained by further splitting the Cus. In a case that the sizes of the CU and the sub-CU are the same, there is one sub-CU in the CU. In a case that the CU has a larger size than the sub-CU, the CU is split into the sub-Cus. For example, in a case that the CU has a size of 8×8 and the sub-CU has a size of 4×4, the CU is horizontally split into two sub-Cus, is vertically split into two sub-Cus, and is thus split into four sub-Cus.

There are two types of predictions (or two prediction modes): intra prediction and inter prediction. Intra prediction is a prediction in an identical picture, and inter prediction is a prediction processing performed between different pictures (for example, between pictures of different display times, or between pictures of different layer images).

Although the transform and quantization processing is performed in units of Cus, the quantization transform coefficient may be entropy-coded in units of 4×4 sub-blocks or the like.

Prediction Parameters

The prediction image is derived by prediction parameters that accompany blocks. The prediction parameters include prediction parameters of intra prediction and prediction parameters of inter prediction.

Hereinafter, the prediction parameters of inter prediction will be described. The inter prediction parameters are constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as an L0 list and an L1 list respectively are to be used, and a corresponding reference picture list is used in a case that the value is 1. Note that, in a case that the present specification mentions "a flag indicating whether or not XX," a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values may be used for true values and false values in real apparatuses and methods.

For example, syntax elements to derive inter prediction parameters include a merge flag merge_flag, a merge index merge_idx, an inter prediction identifier inter_pred_idc, a reference picture index refIdxLX, a prediction vector index mvp_LX_idx, and a difference vector mvdLX.

Reference Picture List

Figure 3A:
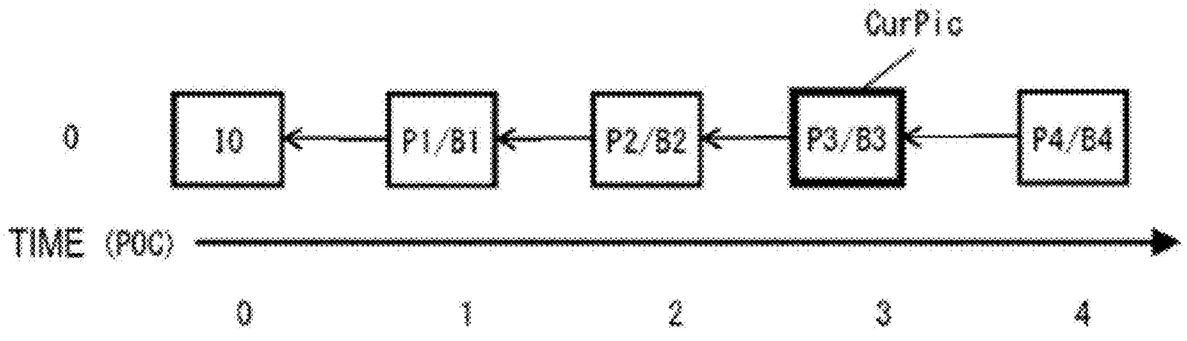
FIGS. 3A-3B are conceptual diagrams respectively illustrating an example of reference pictures and reference picture lists, in accordance with one or more example implementations of this disclosure.
Figure 3B:
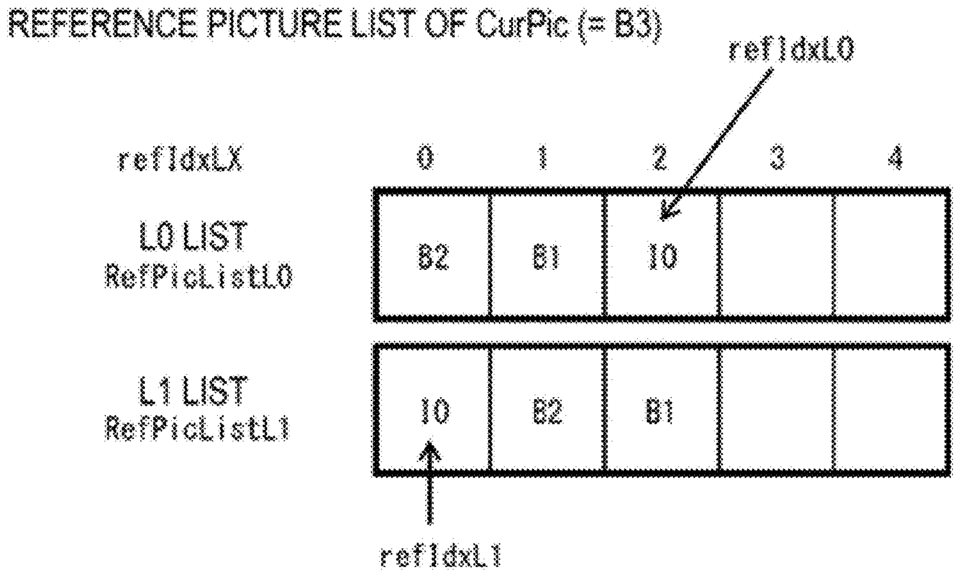

A reference picture list is a list constituted by reference pictures stored in a reference picture memory 306. FIGS. 3A-3B are conceptual diagram respectively illustrating an example of reference pictures and reference picture lists, in accordance with one or more example implementations of this disclosure, in a picture structure for low latency. In FIG. 3A, a rectangle indicates a picture, an arrow indicates a reference relationship of a picture, a horizontal axis indicates time, I, P, and B in a rectangle indicate an intra-picture, a uni-prediction picture, and a bi-prediction picture, respectively, and numbers in rectangles indicates a decoding order. As illustrated in the drawing, the decoding order of the pictures is I0, P1/B1, P2/B2, P3/B3, and P4/B4, and the display order is also the same. FIG. 3B illustrates an example of reference picture lists of the picture B3 (target picture). The reference picture lists are lists to represent candidates of a reference picture, and one picture (slice) may have one or more reference picture lists. In the illustrated example, the target picture B3 has two reference picture lists, namely, an L0 list RefPicList0 and an L1 list RefPicList1. For the individual Cus, which of the pictures in the reference picture list RefPicListX (X=0 or 1) is to be actually referred to is designated by a reference picture index refIdxLX. The drawing shows an example in which refIdxL0=2 and refIdxL1=0. In a case that the target picture is P3, the reference picture list is only the L0 list. Note that LX is a description method used in a case of not distinguishing the L0 prediction and the L1 prediction, and in the following description, the parameter for the L0 list and the parameter for the L1 list are distinguished by replacing LX with L0 or L1.

Merge Prediction and AMVP Prediction

Decoding (coding) methods of prediction parameters include a merge prediction (merge) mode and an adaptive motion vector prediction (AMVP) mode, and merge flag merge_flag is a flag to identify these modes.

The merge prediction mode is a mode used to derive the prediction list utilization flag predFlagLX (or the inter prediction identifier inter_pred_idc), the reference picture index refIdxLX, and the motion vector mvLX from prediction parameters of a nearby block that has already been processed without including these in the coded data. The merge index merge_idx is an index indicating which prediction parameter among prediction parameter candidates (merge candidates) derived from the block that has already been processed is to be used as a prediction parameter for the target block.

The AMVP mode is a mode in which the inter prediction identifier inter_pred_idc, the reference picture index refIdxLX, and the motion vector mvLX are included in the coded data. Note that the motion vector mvLX is coded as a prediction vector index mvp_LX_idx identifying a prediction vector mvpLX and a difference vector mvdLX. The inter prediction identifier inter_pred_idc is a value indicating types and number of reference pictures and takes any of the values PRED_L0, PRED_L1, and PRED_BI. PRED_L0 and PRED_L1 indicate uni-prediction using one reference picture managed by the L0 list and the L1 list, respectively. PRED_BI indicates bi-prediction BiPred using two reference pictures managed by the L0 list and the L1 list.

Motion Vector

The motion vector mvLX indicates a shift amount between blocks in two different pictures. A prediction vector and a difference vector related to the motion vector mvLX are referred to as a prediction vector mvpLX and a difference vector mvdLX, respectively.

Figure 4:
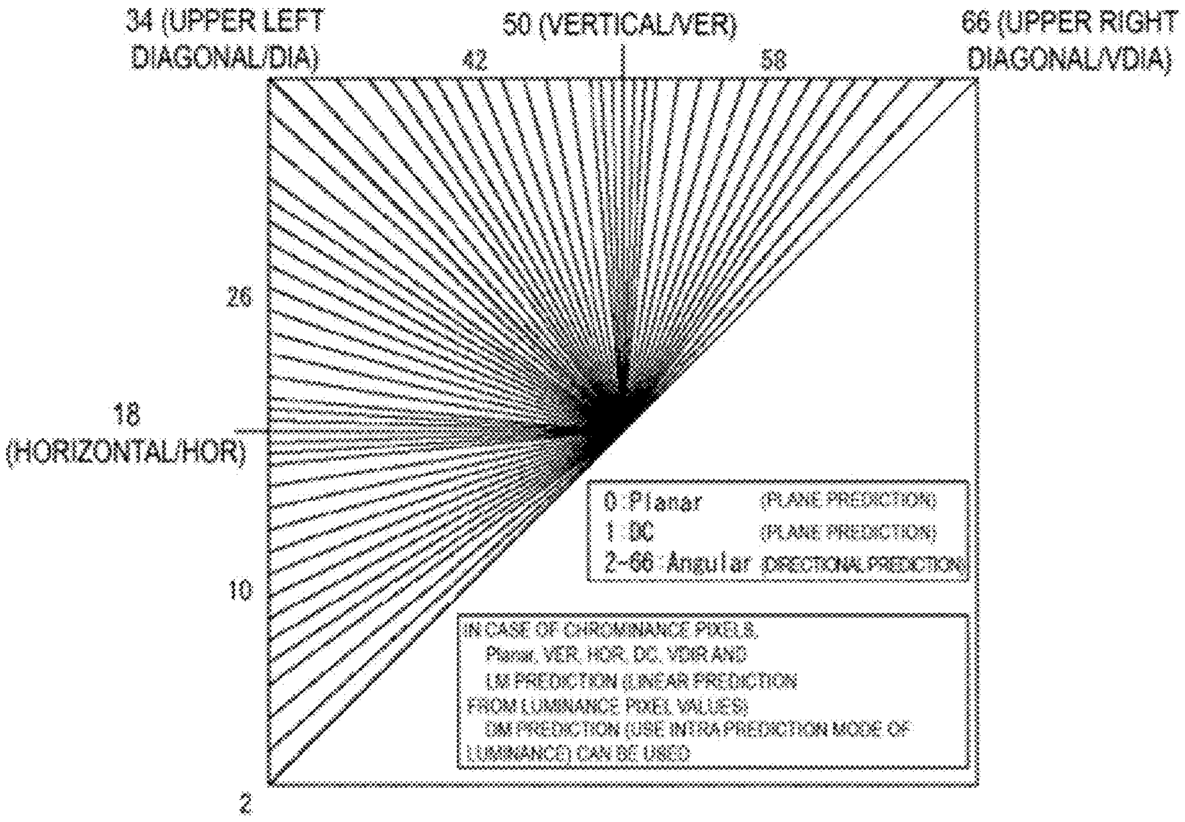
FIG. 4 is a schematic diagram illustrating types (mode numbers) of intra prediction modes, in accordance with one or more example implementations of this disclosure.

Hereinafter, prediction parameters of the intra prediction will be described. The intra prediction parameters are constituted by a luminance prediction mode IntraPredModeY and a chrominance prediction mode IntraPredModeC. FIG. 4 is a schematic diagram illustrating types (mode numbers) of intra prediction modes, in accordance with one or more example implementations of this disclosure. As illustrated in FIG. 4, there are 67 (0 to 66) types of intra prediction modes, for example. For example, there are Planar prediction (0), DC prediction (1), and Angular prediction (2 to 66). Furthermore, LM modes (67 to 72) may be added for chrominance.

Syntax elements to derive the intra prediction parameters include, for example, prev_intra_luma_pred_flag, mpm_idx, rem_selected_mode_flag, rem_selected_mode, and rem_non_selected_mode.

MPM prev_intra_luma_pred_flag is a flag indicating whether or not the luminance prediction mode IntraPredModeY of the target block conforms to a most probable mode (MPM). MPM is a prediction mode included in an MPM candidate list mpmCandList[ ]. The MPM candidate list is a list storing candidates that are estimated to have high likelihoods of application to the target block from the intra prediction mode of an adjacent block and a predetermined intra prediction mode. In a case that prev_intra_luma_pred_flag is 1, the luminance prediction mode IntraPredModeY of the target block is derived using the MPM candidate list and the index mpm_idx.

$$\mathrm{IntraPredMode}Y=\mathrm{mpmCandList}[mpm\_idx]$$

REM

In a case that prev_intra_luma_pred_flag is 0, an intra prediction mode is selected from modes RemIntraPredMode remaining after excluding intra prediction modes included in the MPM candidate list from all the intra prediction modes. The intra prediction mode which is selectable as RemIntraPredMode is referred to as "non-MPM" or "REM". Th flag rem_selected_mode_flag is a flag designating whether an intra prediction mode is to be selected with reference to rem_selected_mode or whether an intra prediction mode is to be selected with reference to rem_non_selected_mode. RemIntraPredMode is derived using rem_selected_mode or rem_non_selected_mode.

Partial Image Region Coding and Decoding Region

Video coding decoding methods of configuring a partial image region in the same picture, performing coding and decoding processing on the partial image region without using pixels in the other region, and performing coding and decoding processing on the other region using the entire picture will be described.

Figure 5:
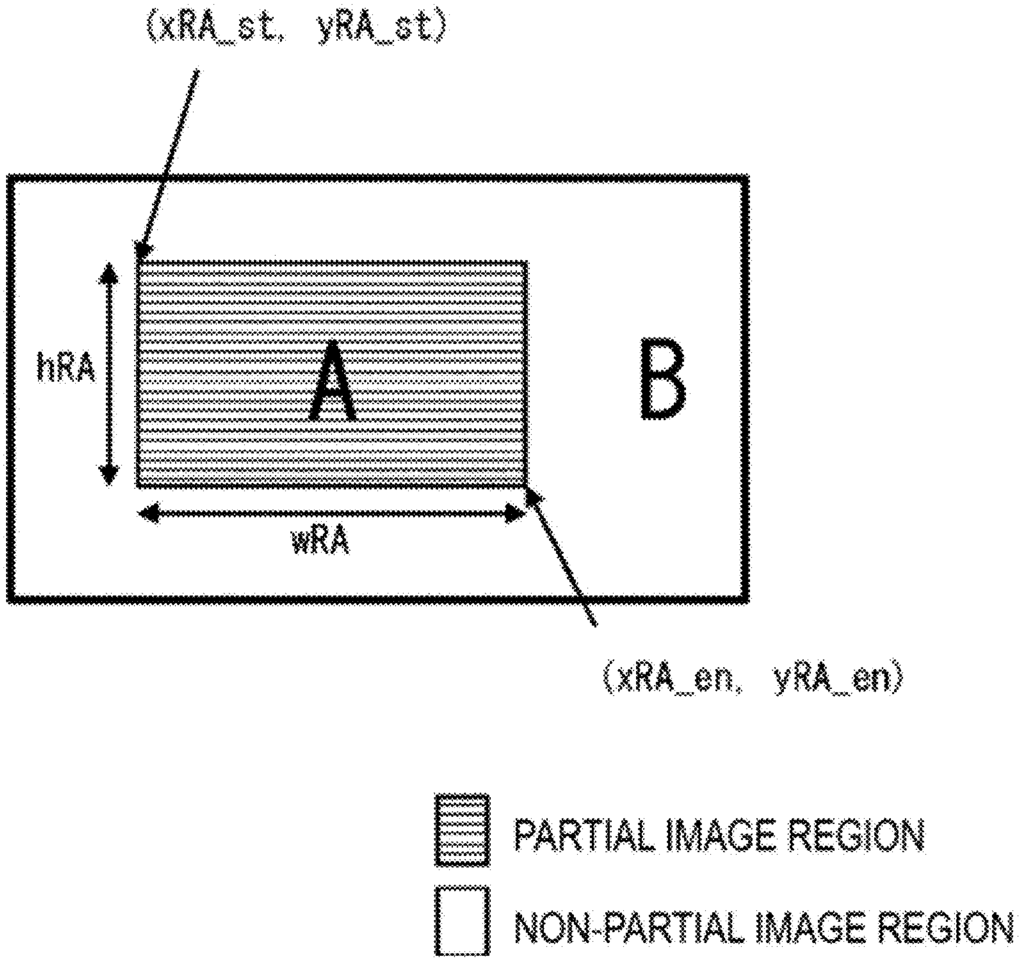
FIG. 5 is a diagram illustrating a partial image region and a non-partial image region, in accordance with one or more example implementations of this disclosure.

FIG. 5 is a diagram illustrating a partial image region A and a non-partial image region B, in accordance with one or more example implementations of this disclosure. According to the video coding apparatus and decoding apparatus in the present invention, regions corresponding to the region A and the region B in the picture are configured. For example, the region A and the region B are configured by a partial image region controller, which will be described later. For the region A, it is possible to perform prediction processing only from the region A, and for the outside of the region, processing similar to that for the outside of the picture or the tile, such as padding, is performed. On the other hand, it is possible to perform prediction processing from the entire picture including the region A for the region B. Here, the "prediction processing" indicates intra prediction, inter prediction, loop filter processing, and the like. As for the region A, the coding processing and the decoding processing are closed in the region A, and it is thus possible to decode only the region A.

Hereinafter, the region A will be referred to as a partial image region (a first region, a controlled region, a clean region, a refreshed region, a region A). On the other hand, the region other than the partial image region will also be referred to as a non-partial image region (a second region, a non-controlled region, a dirty region, an unrefreshed region, a region B, outside of the limited region).

For example, a region that is coded and decoded only through the intra prediction and that has already been coded through intra prediction (a newly refreshed region IRA obtained only through intra, which will be described later) is a partial image region. A region that is coded and decoded further referring the partial image region constituted through the intra prediction is also a partial image region. Further, a region that is coded and decoded with reference to the partial image region in the reference picture as in the inter prediction, for example, is also a partial image region. In other words, the partial image region is a region that is coded and decoded referring only to the pixels in the partial image region without referring to the pixels in the non-partial image region.

Hereinafter, the upper left position of a partial image region is indicated as (xRA_st, yRA_st), the lower right position thereof is indicated as (xRA_en, yRA_en), and the size thereof is indicated as (wRA, hRA). Also, because the position and the size have the following relationship, one of them may be derived from the other.

$$xRA\_en=xRA\_st+wRA-1$$

$$yRA\_en=yRA\_st+hRA-1$$

Also, the following derivation may also be employed.

$$wRA=xRA\_en-xRA\_st+1$$

$$hRA=yRA\_en-yRA\_st+1$$

Further, the upper left position of a limited reference region at a time j is indicated as (xRA_st[j], yRA_st[j]), the lower right position thereof is indicated as (xRA_en[j], yRA_en[j]), and the size thereof is indicated as (wRA[ ], hRA[j]). Also, the position of the limited reference region of the reference picture Ref may be indicated as (xRA_st[Ref], yRA_st[Ref]), the lower right position may be indicated as (xRA_en[Ref], yRA_en[Ref]), and the size thereof may be indicated as (wRA[Ref], hRA[Ref]).

Determination of Partial Image Region

For example, in a case that a certain picture is taken at a time i and the position of a certain block is (x, y), whether or not a pixel at the position is inside a partial image region may be determined by the following equation.

$$IsRA(x,y)=(xRA\_st[i]<=x\ \&\&\ x<=xRA\_en[i]\&\&\ yRA\_st[i]<=y\ \&\&\ y<=yRA\_en[i])$$

Alternatively, the following determination equation may be used.

$$IsRA(x,y)=(xRA\_st[i]<=x\ \&\&\ x<xRA\_st[i]+wRA[i]\&\&\ yRA\_st[i]<=y\ \&\&\ y<yRA\_st[i]+hRA[i])$$

$$IsRA(x\mathrm{Ref},y\mathrm{Ref})=(xRA\_st[\mathrm{Ref}]<=x\mathrm{Ref}\ \&\&\ x\mathrm{Ref}<=xRA\_en[\mathrm{Ref}]\&\&\ yRA\_st[\mathrm{Ref}]<=y\mathrm{Ref}\ \&\&\ y\mathrm{Ref}<=yRA\_en[\mathrm{Ref}])$$

For example, in a case that the target picture is taken at the time i, the upper left coordinates of the target block Pb are (xPb, yPb), and the width and the height are bW and bH, the intra prediction unit, the motion compensation unit, and the loop filter of the video decoding apparatus and the video coding apparatus derive IsRA(Pb) by the following determination equation if the target block Pb is inside the partial image region.

$$IsRA(Pb)=(xRA\_st[i]<=xPb\ \&\&\ xPb<=xRA\_en[i]\&\&\ yRA\_st[i]<=yPb\ \&\&\ yPb<=yRA\_en[i])$$

Alternatively, the following determination equation may be used.

$$IsRA(Pb)=(xRA\_st[i]<=xPb\ \&\&\ xPb<xRA\_st[i]+wRA[i]\}\ \&\&\ yRA\_st[i]<=yPb\ \&\&\ yPb<yRA\_st[i]+hRA[i])$$

Basic Operations for Reference Region of Partial Image Region

The video coding apparatus and the video decoding apparatus according to the present specification perform the following operations.

Figure 6A:
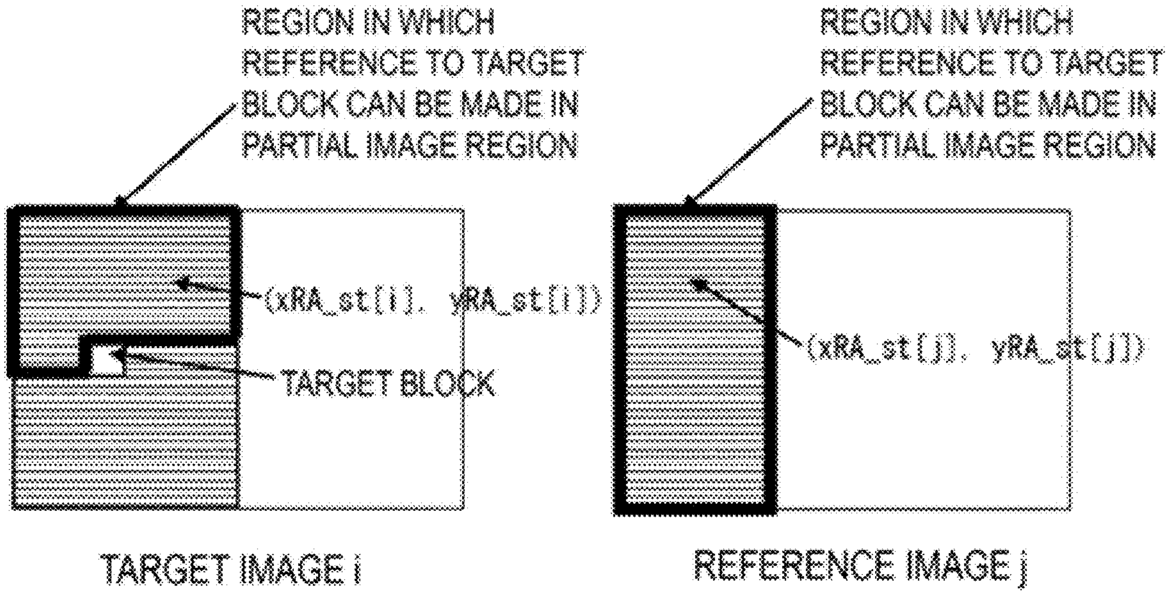
FIGS. 6A-6B are diagrams respectively illustrating a range in which a target block may be referred to, in accordance with one or more example implementations of this disclosure.
Figure 6B:
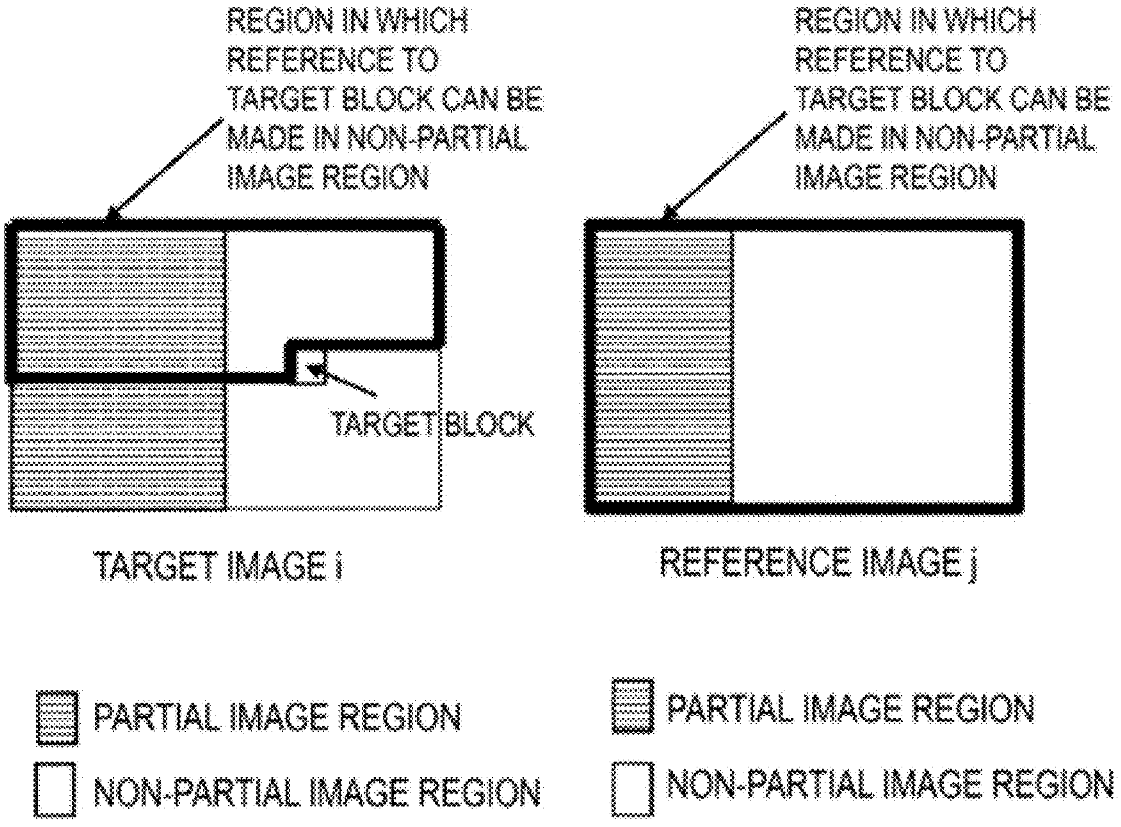

FIGS. 6A-6B are diagrams respectively illustrating a range in which a target block may be referred to, in accordance with one or more example implementations of this disclosure. The range in which the partial image region having the target block may be referred to through the intra prediction, the inter prediction, and the loop filter is shown according to the present disclosure. The region surrounded by the thick line in the picture in FIG. 6A is a region that is included in the partial image region and that has already been coded and decoded. The region that is included in the partial image region in the same picture (target image i) as that of the target block and that has already been coded and decoded is a range in which the target block may be referred to through the intra prediction, the inter prediction, and the loop filter. Similarly, the partial image region in the reference picture (reference image j) is a range in which the target block may be referred to through the inter prediction and the loop filter. FIG. 6B illustrates a range in which the target block included in the non-partial image region may be referred to. The region surrounded by the thick line in the picture in FIG. 6B is a region that has already been coded and decoded in the target picture. The region that has already been coded or decoded in the target picture (target image i) is a range in which the target block may be referred to through the intra prediction and the inter prediction. Similarly, all the regions in the reference picture (reference image j) are in the range in which reference may be made through the inter prediction. Note that, in a case that parallel processing and reference restriction of tiles, slices, wavefronts, and the like are used, other restrictions may be added in addition to the aforementioned restrictions.

- For the target block included in the partial image region, intra prediction referring only to pixels in the partial image region in the target picture or inter prediction referring to the limited reference region of the reference picture is performed.
- For the target block included in the partial image region, the coding parameter of the target block is derived with reference to the coding parameter (for example, the intra prediction direction, the motion vector, or the reference picture index) of the partial image region in the target picture or with reference to the coding parameter of the limited reference region of the reference picture.
- For the target block included in the partial image region, loop filter processing is performed referring only to the pixels in the partial image region in the target picture.

Determination and Availability of Partial Image Region

In MPM derivation of the intra prediction, merge candidate derivation of the inter prediction and the like, the prediction parameters (the intra prediction mode, the motion vector) of the target block may be derived using prediction parameters of the adjacent region. In such a case, the following processes may be performed. In a case that in a case that the target block in the intra prediction and the inter prediction is the partial image region (IsRA(xPb, yPb) is true) and the reference position (xNbX, yNbX) of the adjacent block of the target block is the non-partial image region (IsRA(xNbX, yNbX) is false), the value of the adjacent block is not used to derive the prediction parameters. In other words, in a case that the target block is the partial image region (IsRA(xPb, yPb) is true) and the reference position (xNbX, yNbX) of the adjacent block of the target block is the partial image region (IsRA(xNbX, yNbX) is true), the position (xNbX, yNbX) is used to derive the prediction parameters.

Note that the derivation of prediction candidates has been described above, the determination of the partial image region may be used generally for determining a region outside the screen similarly to the determination of units (the slice boundary, the tile boundary) for the region outside the screen or parallel processing. In this case, in a case that the target block is the partial image region (IsRA (xPb, yPb) is true) and the reference position (xNbX, yNbX) of the target block is the partial image region (IsRA(xNbX, yNbX) is true), it is determined that the reference position (xNbX, yNbX) cannot be referred to (availableNbX=0). In other words, in a case that the target block is within the screen, the target block and the reference position are not in the same different parallel processing unit, and the target block is present in the non-partial image region, or the reference position (xNbX, yNbX) of the target block is the partial image region (IsRA(xNbX, yNbX) is true), it is determined that the reference position (xNbX, yNbX) may be referred to (availableNbX=1). In the intra prediction and the inter prediction, in a case that the reference position (xNbX, yNbX) may be referred to (availableNbX=1), the prediction parameters at the reference position are used to derive the prediction parameters of the target block.

Determination of Limited Reference Region and Clipping of Limited Reference Region Also, in a case that the reference picture is taken at the time j and the upper left position of the reference image is (xRef, yRef), the motion compensation unit derives the case that the reference pixels are present within the limited reference region using the following determination equation.

$$IsRA(x\mathrm{Ref},y\mathrm{Ref})=(xRA\_st[j]<=x\mathrm{Ref}\ \&\&\ x\mathrm{Ref}<=xRA\_en[j]\&\&\ yRA\_st[j]<=y\mathrm{Ref}\ \&\&\ y\mathrm{Ref}<=yRA\_en[j])$$

Alternatively, the following determination equation may be used.

$$IsRA(x\mathrm{Ref},y\mathrm{Ref})=(xRA\_st[j]<=x\mathrm{Ref}\ \&\&\ x\mathrm{Ref}<xRA\_st[j]+wRA[j]\&\&\ yRA\_st[i]<=y\mathrm{Ref}\ \&\&\ y\mathrm{Ref}<yRA+st[j]+Hra[j])$$

Also, the motion compensation unit may clip the reference pixels at positions in the partial image region using the following equations.

$$X\mathrm{ref}=\mathrm{Clip3}(xRA\_st[j],xRA\_en[j],x\mathrm{Ref})$$

$$Y\mathrm{ref}=\mathrm{Clip3}(yRa\_st[j],yRA\_en[j],y\mathrm{Ref})$$

Alternatively, the following derivation equations may be used.

$$x\mathrm{Ref}=\mathrm{Clip3}(xRA\_st[j],xRA\_st[j]+wRA[j]-1,x\mathrm{Ref})$$

$$y\mathrm{Ref}=\mathrm{Clip3}(yRa\_st[j],yRA\_st[j]+hRA[j]-1,y\mathrm{Ref})$$

Note that the position of the partial image region is transmitted from the video coding apparatus to the video decoding apparatus using gradual refresh information, which will be described later. Note that instead of deriving the position and the size of the partial image region in accordance with the time (for example, the POC), a reference picture Ref in a reference memory may be configured after the target picture is decoded or at a time when decoding of the target picture is started. In this case, it is possible to derive the position and the size of the partial image region through designation of the reference picture Ref.

SDR Picture

The entire instantaneous decoder refresh (IDR) picture in the AVC or the HEVC is an intra CTU, may be randomly accessed, and realizes a random-access of coded data as a picture that may be independently decoded. In the present embodiment, the picture in which the partial image region has entirely been intra-coded may be identified with nal_unit_type of a network abstraction layer (NAL) as a sequentially decoder refresh (SDR) picture.

As for the SDR picture, it is possible to independently decode a partial screen region in the picture and to randomly access the partial screen region.

Because the entire IDR picture in the related art corresponds to intra while a part of the SDR picture corresponds to intra, the coding amount varies less.

Parameter Decoder 302

The parameter decoder 302 configures a partial image region as follows, for example, in an SDR picture.

A partial image region is configured as a rectangle defined by the coordinates of the upper left CTU and the numbers of CTUs corresponding to the width and the height.

A partial image region is configured as a rectangle defined by the position of the upper left pixel and the numbers of pixels corresponding to the width and the height.

Multiple partial image regions are configured in a single picture.

Multiple partial image regions are configured such that the partial image regions are superimposed on each other.

"The multiple partial image region are superimposed on each other" means that multiple partial image regions included in one picture may include a CTU at the same position, for example.

In addition, partial image regions of multiple pictures in a group of pictures (GOP) may be superimposed on each other. Here, "the partial image regions are superimposed on each other" corresponds to the situation that the partial image region configured in the SDR picture and the partial image region configured in the next picture of the SDR picture include CTUs at the same position. The number of pictures including the partial image regions superimposed on each other is not particularly limited, and the pictures are multiple pictures continuing from the SDR picture in the GOP.

Figures 7, 8:
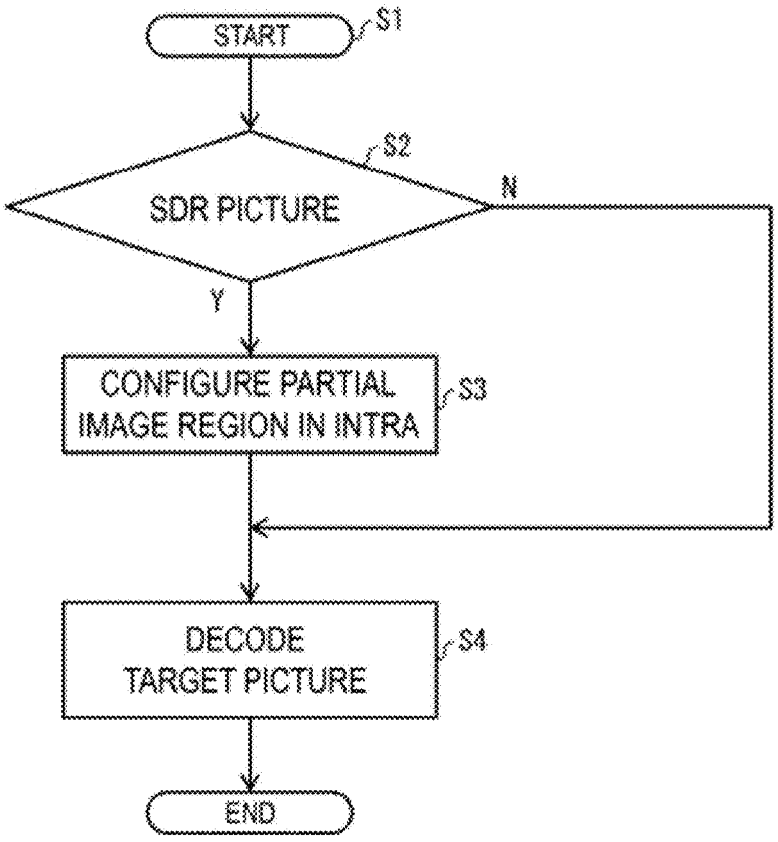
FIG. 7 is a flowchart illustrating a flow of decoding processing performed by a parameter decoder, in accordance with one or more example implementations of this disclosure.
FIG. 8 is a diagram illustrating an example of a syntax provided as a notification for configuring the partial image region, in accordance with one or more example implementations of this disclosure.

Flow of Processing Performed by Parameter Decoder 302 (SDR Picture) FIG. 7 is a flowchart illustrating a flow of decoding processing performed by the parameter decoder 302, in accordance with one or more example implementations of this disclosure.

Step S1

Decoding is started, and the processing proceeds to Step S2.

Step S2

The parameter decoder 302 determines whether or not the target picture is an SDR picture with nal_unit_type of NAL. The processing proceeds to S3 in a case that the target picture is an SDR picture, and the processing proceeds to S4 in a case that the target picture is not an SDR picture.

Step S3

The partial image region included in the target picture is configured as a region to be decoded through intra prediction, and the processing proceeds to S4.

Step S4

The parameter decoder 302 decodes the target picture.

The video decoding apparatus 31 may decode a video of only the partial image region of the pictures continuing from the SDR picture by configuring the partial image region in this manner.

Example 1 of Region Information

A syntax for configuring partial image regions may be included in a picture parameter set. FIG. 8 is a diagram illustrating an example of a syntax provided as a notification for configuring partial image regions, in accordance with one or more example implementations of this disclosure. Partial_region_mode is information for specifying whether or not to define partial image regions in pictures. In a case that partial_region_mode included in the picture parameter set is 1, the entropy decoder 301 included in the video decoding apparatus 31 determines that it is necessary to configure the partial image regions and decodes num_of_patial_region_minus1.

num_of_patial_region_mius1 indicates "the number of partial image regions−1" in the picture. Position_ctu_address[i] indicates the address of the upper left CTU in the i-th partial image region of multiple partial image regions in the pictures. Region_ctu_width_minus1[i] indicates, in regard to the i-th partial image region from among multiple partial image regions in the pictures, "the number of CTUs in the partial image region in the horizontal direction−1". Region-ctu_height_minus1[i] indicates, in regard to the i-th partial image region from among multiple partial image regions in the pictures, the number of CTUs in the partial image region in the vertical direction−1".

The entropy decoder 301 adds one to i until i becomes equal to the value of num_of_patial_region_minus1 and decodes position_ctu_adress[i], region_ctu_width_minus1 [i], and region_ctu_height_minus1[i].

Then, the partial image region controller 320 included in the video decoding apparatus 31 configures, in a target picture, a partial image region at the position and with the size specified by position_ctu_adress[i]
region_ctu_width_minus1[i]
region_ctu_height_minus1[i]

for each i.

Note that num_of_patial_region_minus1
position_ctu_adress[i]
region_ctu_width_minus1[i]
region_ctu_height_minus1[i]

are examples of region information for specifying the partial image regions.

Example 2 of Region Information

Figures 9, 10:
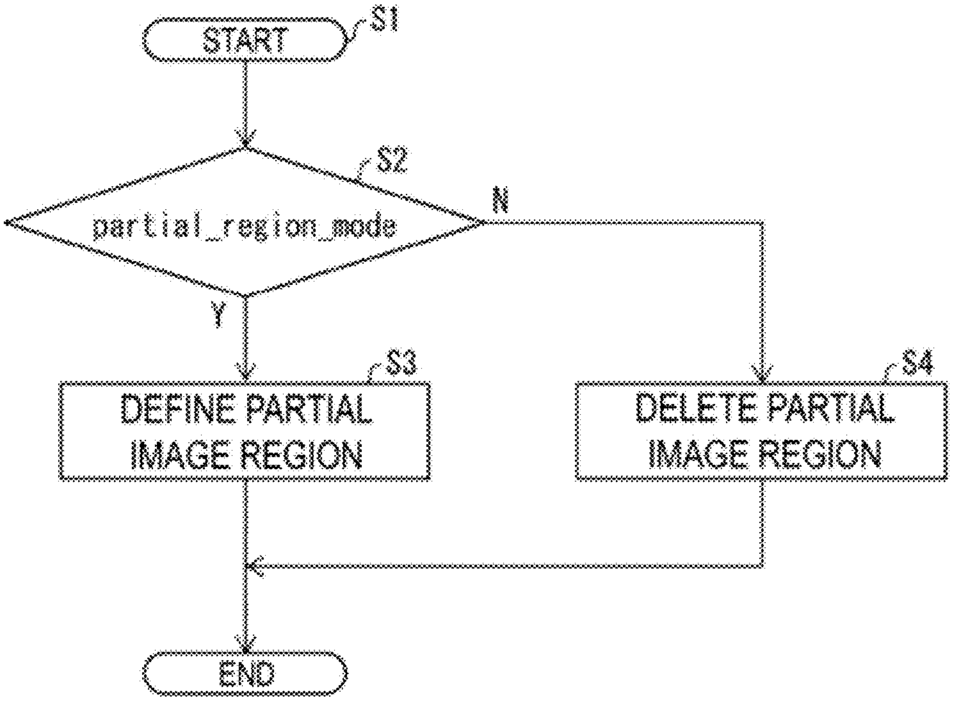
FIG. 9 is a diagram illustrating an example of the syntax provided as the notification for configuring the partial image region, in accordance with one or more example implementations of this disclosure.
FIG. 10 is a flowchart illustrating a flow of a partial image region configuring procedure, in accordance with one or more example implementations of this disclosure.

A syntax for configuring partial image regions may be included in a slice header. FIG. 9 is a diagram illustrating an example of a syntax provided as a notification for configuring the partial image regions, in accordance with one or more example implementations of this disclosure. First_slice_segment_in_pic_flag is a flag indicating whether or not a corresponding slice is the first slice in a decoding order. In a case that first slice_segment_in_pic_flag is 1, this indicates that the corresponding slice is the first slice. Also, in a case that first_slice_segment_in_pic_flag is 0, this indicates that the corresponding slice is not the first slice. In a case that first slice_segment_in_pic_flag is 1, partial_region_mode is configured, and the entropy decoder 301 included in the video decoding apparatus 31 decodes num_of_patial_region_minus1.

num_of_patial_region_minus1 indicates "the number of partial image regions−1" in a slice. Position_ctu_adress[i] indicates the address of the upper left CTU in the i-th partial image region from among multiple partial image regions that are present in the slice. Region_ctu_width_minus1[i] indicates, in regard to the i-th partial image region from among multiple partial image regions in the slice, "the number of CTUs in the partial image region in the horizontal direction−1". Region_ctu_height_minus1[i] indicates, in regard to the i-th partial image region from among the multiple partial image regions in the slice, "the number of CTUs in the partial image region in the vertical direction−1."

The entropy decoder 301 adds one to i until i becomes equal to the value of num_of_patial_region_minus1 and decodes position_ctu_adress[i], region_ctu_width_minus1[i], and region_ctu_height_minus1[i].

Then, the partial image region controller 320 included in the video decoding apparatus 31 configures, in a target slice, a partial image region at a position with a size specified by position_ctu_adress[i]
region_ctu_width_minus1[i]
region_ctu_height_minus1[i]

for each i.

Note that num_of_patial_region_minus1
position_ctu_adress[i]
region_ctu_width_minus1[i]
region_ctu_height_minus1[i]

are examples of region information for specifying the partial image regions.

Note that although one CTU is regarded as a minimum unit in the above example, one or multiple CTU columns or one or multiple CTU rows and multiple CTUs may be configured as minimum units.

Example of Procedure for Configuring Partial Image Region

FIG. 10 is a flowchart illustrating a flow of a partial image region configuring procedure, in accordance with one or more example implementations of this disclosure. The partial image region configuring procedure may be performed by the video decoding apparatus 31 in a case that partial image regions are defined in a picture parameter set.

Step S1

The decoding processing is started, and processing proceeds to Step S2.

Step S2

The entropy decoder 301 moves on to Step S3 in a case of partial_region_mode (in a case that partial_region_mode is 1) and moves on to Step S4 in a case of not partial_region_mode (in a case that partial_region_mode is 0).

Step S3

In a case of partial_region_mode, the entropy decoder 301 decodes each syntax included in region information, and the partial image region controller 320 defines partial image regions designated by each syntax and ends the processing. Specific processing of configuring the partial image regions is as described above.

Step S4

In a case of not partial_region_mode, the video decoding apparatus 31 deletes the partial image regions and ends the processing.

Partial Image Region Map

The parameter decoder 302 may be configured to configure a partial image region map (partial_region_map) as information representing the position of the partial image region for each picture.

FIG. 11 is a diagram illustrating a configuration of a partial image region map, in accordance with one or more example implementations of this disclosure. The example of the syntax may be provided as a notification to configure partial image regions. Partial_region_map is a syntax representing whether or not a corresponding region is a partial screen region for each CTU inside a picture. The entropy decoder 301 included in the video decoding apparatus 31 determines that the corresponding region is a partial image region in a case that partial_region_map is 1 and determines that the corresponding region is a non-partial image region in a case that partial_region_map is 0. Partial_region_mode is information for specifying whether or not to define partial image regions in pictures.

PicHeightInCtbsY indicates the number of CTUs in a picture in the vertical direction, and PicWidthInCtbsY indicates the number of CTUs in the picture in the horizontal direction.

One is added to i until i becomes equal to num_of_patial_region_minus1+1, and y=position_ctu_adress[i]/PicWidthInCtbsY and x=position_ctu_adress[i]%PicWidthInCtbsY are calculated.

One is added to j until j becomes equal to region_ctu_width_minus1[i], one is added to k until k becomes equal to rgion_ctu_height_minus1[i], and corresponding partial_region_map[h+j][w+k] is configured to be one.

The partial image region controller 320 of the parameter decoder 302 may be configured to configure partial image regions with reference to thus generated partial_region_map.

Information regarding partial_region_map representing the position of the partial image region saved for each picture is managed by a decoder picture buffer (DPB) in a decoded picture memory. Further, information regarding partial_region_map is stored in the reference picture list in the reference picture memory 306 to be used for inter prediction performed by the prediction image generation unit 308.

Here, in regard to the order of decoding and coding of the CTUs, the video decoding apparatus 31 decodes the CTUs in a raster scanning order in units of pictures or tiles without distinguishing the CTUs in the partial image region and the non-partial image region, and the video coding apparatus 11 codes the CTUs in a raster scanning order without distinguishing the CTUs in the partial image region and the CTUs in the non-partial image region.

Also, the entropy coder 104 is configured to perform entropy coding without distinguishing the partial image region and the non-partial image region, and the entropy decoder 301 is configured to perform entropy decoding independently for the partial image region and for the non-partial image region. More specifically, the entropy coder 104 and the entropy decoder 301 are configured to update context in a continuous manner between the partial image region and the non-partial image region.

Because the concepts of the partial image region and the non-partial image region described in the present embodiment are concepts that are independent from the decoding and coding orders, the orders of decoding and coding the CTUs may be mutually independent between the partial image region and the non-partial image region.

In one example, the video decoding apparatus 31 may be configured to mutually independently decode the CTUs in the partial image region and the CTUs in the non-partial image region in a raster scanning order, and the video coding apparatus 11 may be configured to mutually independently code the CTUs in the partial image region and the CTUs in the non-partial image region in a raster scanning order.

Also, the entropy coder 104 may be configured to perform entropy coding independently for the partial image region and the non-partial image region, and the entropy decoder 301 may be configured to perform entropy decoding independently for the partial image region and for the non-partial image region. More specifically, the entropy coder 104 and the entropy decoder 301 may be configured to update context independently for the partial image region and the non-partial image region.

Decoding of Partial Image Region

In the above-mentioned configurations, an initial configuration of a partial image region is performed with an SDR picture. The video coding apparatus 11 codes a video signal in which partial image regions that is temporally continuous are configured to create a bit stream. If the video decoding apparatus 31 finds an SDR picture from nal_unit_type of NAL in the bit stream, the video decoding apparatus 31 first performs intra coding and loop filter processing on the partial image region in the SDR picture without referring to the non-partial region. It is thus possible to properly decode the partial image region. Because for the partial image region of a picture decoded later, the non-partial image region is not referred to in a case of the inter coding and the non-partial image region of the picture is not referred to in a case of the intra coding and the loop filter processing, it is possible to secure that the partial image region may be properly decoded.

Second Embodiment

Gradual Refresh

An embodiment in which the methods of coding and decoding a partial image region according to the present invention are applied to intra refresh will be described. In general, intra refresh is a method of configuring a region to be intra-coded at a part of a picture and temporally moving the region in the picture such that the entire picture may be intra-coded in a specific period of time. An object is to intra-code an entire picture without increasing the coding amount of the specific picture, realize random-access, and realize recovery from an error in a case that there has been an error in a bit stream by spitting the picture in a specific period of time and performing intra coding thereon. In the present embodiment, coding and decoding of a partial screen region, using an SDR picture, and a gradual refresh function equivalent to intra refresh are realized.

Figure 12A:
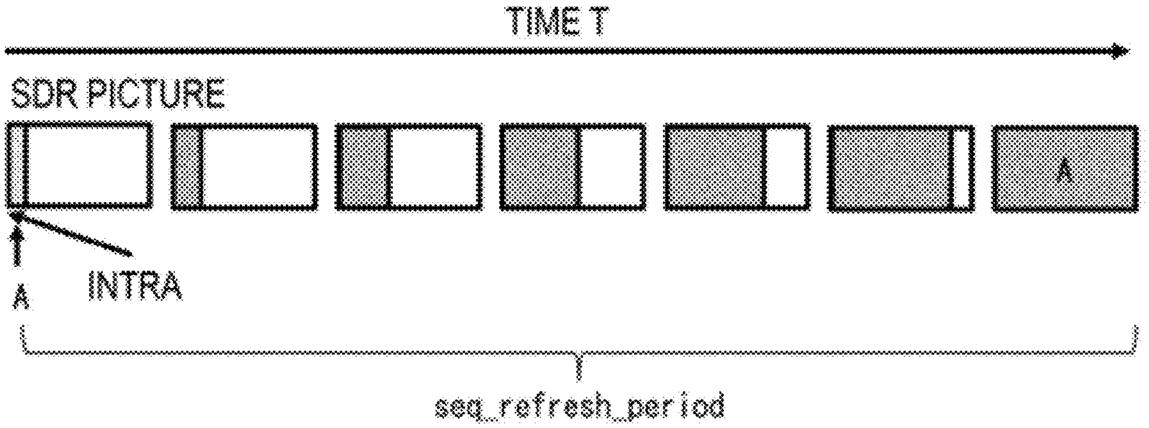
FIGS. 12A-12B are diagrams respectively illustrating the gradual refresh, in accordance with one or more example implementations of this disclosure.
Figure 12B:
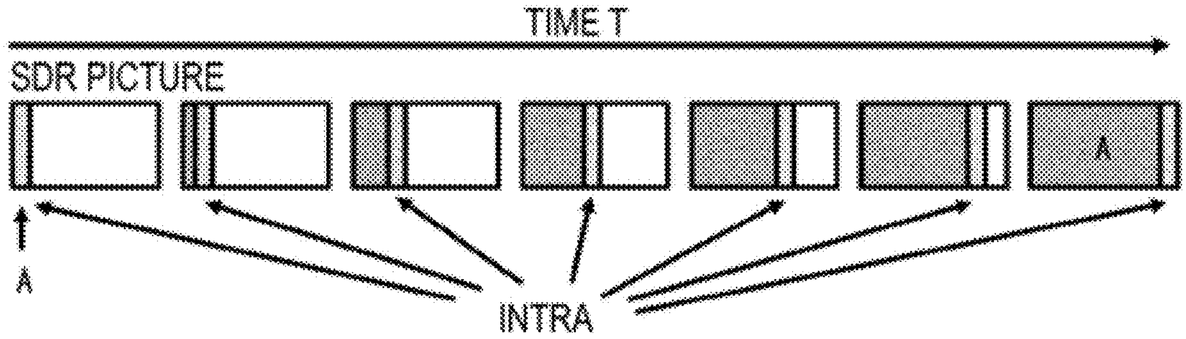

FIGS. 12A-12B are diagrams respectively illustrating the gradual refresh, in accordance with one or more example implementations of this disclosures. FIG. 12A is a diagram for explaining an overview of gradual refresh, in accordance with one or more example implementations of this disclosures. In the gradual refresh according to the present embodiment, the parameter coder 111 configures a partial image region A at a part of a picture first, and the gradual refresh is started from an SDR picture in which the partial image region has been intra-coded and is ended at a time when the partial screen region A temporally includes a previous partial image region, the region is caused to increase, and the partial screen region A reaches the entire picture.

If the video decoding apparatus 31 sets the SDR picture as an access point, starts decoding from the bit stream, and performs decoding until the region A reaches the entire picture, then the entire picture may be properly decoded.

A method of configuring a partial image region may be specified in a PPS or a slice header by using the method described in the first embodiment, or in a case that seq_refresh_enable_flag, which will be described later, is 1, the partial image region may be caused to implicitly increase for each CTU column, each CTU row, or each CTU in a coding order of the picture after the partial image region is configured in the SDR picture.

A non-reference picture refers to other pictures but is not referred to by other pictures. In a non-reference picture, the partial image region may not be configured by the gradual refresh.

FIG. 12B is a diagram for explaining an overview of other gradual refresh, in accordance with one or more example implementations of this disclosures. In the gradual refresh according to the present embodiment, the parameter coder 111 first configures a partial image region A at a part of a picture and causes the partial screen region A to temporally include previous partial image regions and increases in size starting from the SDR picture in which the partial image region has been intra-coded. At this time, the partial image region caused to increase in size is intra-coded. Then, at a time when the partial screen region A reaches the entire picture, the gradual refresh ends. Since it is difficult to correctly perform inter prediction, which is prediction in a time direction, for the partial image region caused to increase in size, the partial image region may be coded with reference to the coding parameters.

If the video decoding apparatus 31 sets the SDR picture as an access point, starts decoding from the bit stream, and performs decoding until the region A reaches the entire picture, then the entire picture may be properly decoded.

FIG. 13 is a diagram illustrating syntax necessary for the gradual refresh, in accordance with one or more example implementations of this disclosure. The example of a syntax may be provided as a notification to realize the gradual refresh. The syntax (gradual refresh information) may be provided as a notification using a sequence parameter set (SPS). Seq_refresh_enable_flag is a flag indicating whether or not to use the gradual refresh for pictures after the SDR picture. The parameter decoder 302 decodes the gradual refresh information, and the video decoding apparatus 31 performs decoding using the gradual refresh in a case that seq_refresh_enable_flag flag is 1 and does not use the gradual refresh in a case that seq_refresh_enable_flag is 0. The parameter decoder 302 decodes seq_refresh_period in a case that seq_refresh_enable_flag is 1. seq_refresh_period indicates the number of pictures until the entire picture may be properly decoded from the SDR picture that is a random-access point. Note that the number of non-reference pictures may not be counted at this time.

Figure 14:
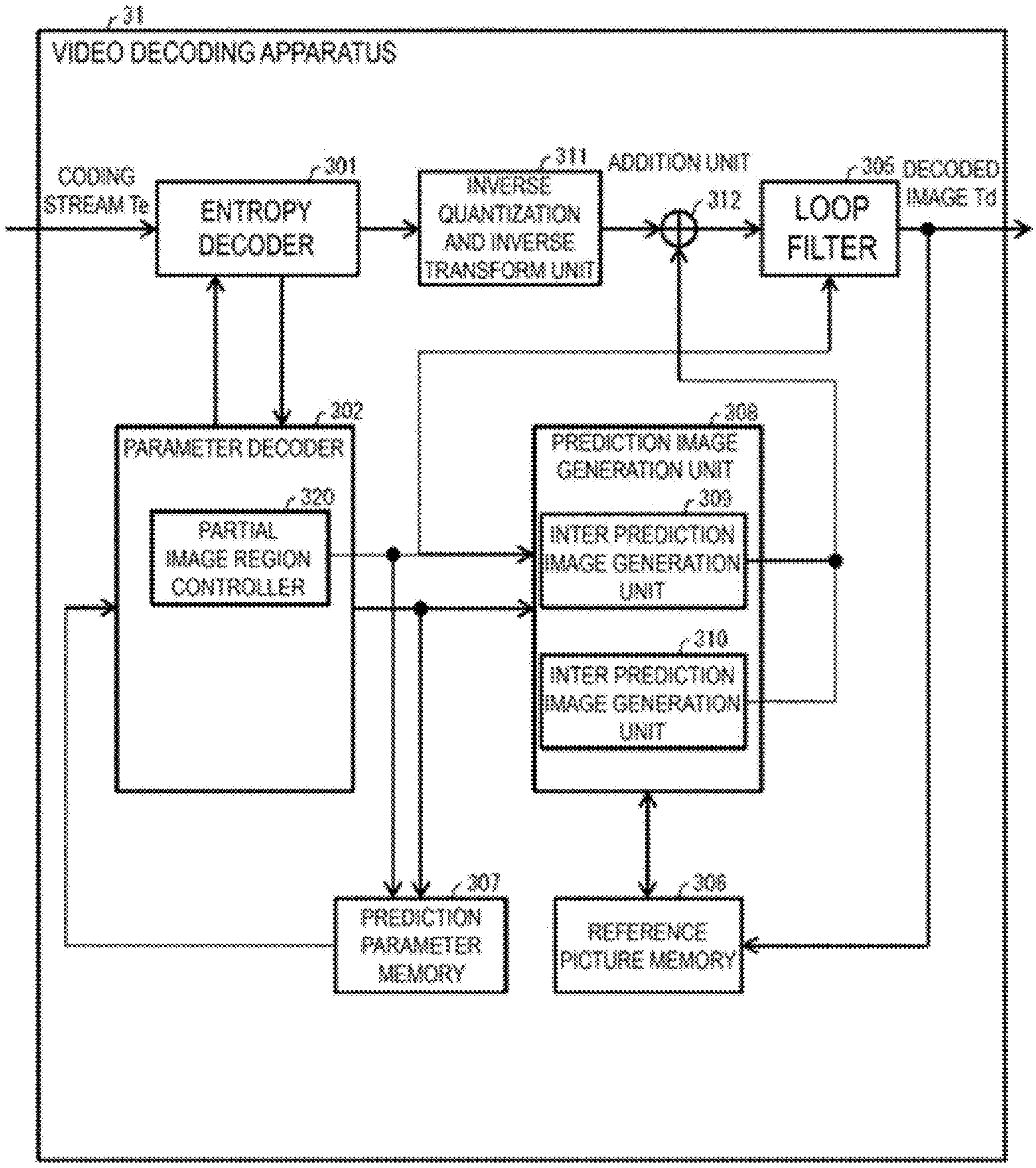
FIG. 14 is a schematic diagram illustrating a configuration of a video decoding apparatus, in accordance with one or more example implementations of this disclosure.

Configuration of Video Decoding Apparatus FIG. 14 is a schematic diagram illustrating a configuration of a video decoding apparatus 3, in accordance with one or more example implementations of this disclosure.

The video decoding apparatus 31 is configured to include an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform unit 311, and an addition unit 312. Note that a configuration in which the loop filter 305 is not included in the video decoding apparatus 31 may be combined with the video coding apparatus 11, which will be described later.

The parameter decoder 302 includes a partial image region controller 320, the partial image region controller 320 includes a header decoder 3020, a CT information decoder 3021, and a CU decoder 3022 (prediction mode decoder), which are not illustrated in the drawing, and the CU decoder 3022 further includes a TU decoder 3024. The header decoder 3020 decodes parameter set information, such as VPS, SPS, and PPS, from coded data. The header decoder 3020 decodes a slice header (slice information) from the coded data. The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

In addition, the parameter decoder 302 is configured to include an inter prediction parameter decoder 303 and an intra prediction parameter decoder 304, which are not illustrated in the drawing. The prediction image generation unit 308 includes an inter prediction image generation unit 309 and an intra prediction image generation unit 310.

Although an example in which a CTU and a CU are used as units of processing will be described below, the present invention is not limited thereto, and processing may be performed in units of sub-CUs. Alternatively, a CTU, a CU, and a TU may be read as a block instead, and a sub-CU may be read as a sub-block instead, to understand the processing as processing in units of blocks or sub-blocks.

The entropy decoder 301 performs entropy decoding on the coded stream Te input from the outside and separates and decodes individual codes (syntax elements). For entropy coding, there are a scheme in which variable length coding is performed on the syntax elements using context (probability model) adaptively selected in accordance with types of syntax elements and a surrounding condition and a scheme in which variable length coding is performed on the syntax elements using a predefined table or a calculation equation. Representative examples of the former case include context adaptive binary arithmetic coding (CABAC). The separated codes include prediction information to generate a prediction image, a prediction error to generate a difference image, and the like.

The entropy decoder 301 outputs a part of the separated codes to the parameter decoder 302. Apart of the separated codes includes, for example, a prediction mode predMode, a merge flag merge_flag, a merge index merge_idx, an inter prediction identifier inter_pred_idc, a reference picture index refIdxLX, a prediction vector index mvp_LX_idx, and a difference vector mvdLX. Which code is to be decoded is controlled based on an indication of the parameter decoder 302. The entropy decoder 301 outputs quantization transform coefficients to the inverse quantization and inverse transform unit 311.

The loop filter 305 is a filter that is provided in a coding loop and removes block distortion and ringing distortion to improve image quality. The loop filter 305 applies a filter, such as a deblocking filter 3051, a sample adaptive offset (SAO), and an adaptive loop filter (ALF), on a decoded image of a CU generated by the addition unit 312.

The reference picture memory 306 stores a decoded image of the CU generated by the addition unit 312 at a predefined position for each target picture and target CU.

The prediction parameter memory 307 stores prediction parameters at predefined position for each CTU or each CU to be decoded. Specifically, the prediction parameter memory 307 stores the parameters decoded by the parameter decoder 302, the prediction mode predMode separated by the entropy decoder 301, and the like.

The prediction mode predMode, the prediction parameters, and the like are input to the prediction image generation unit 308. In addition, the prediction image generation unit 308 reads a reference picture from the reference picture memory 306. The prediction image generation unit 308 generates a prediction image of a block or a sub-block using the prediction parameters and the read reference picture (reference picture block) in the prediction mode (intra prediction, inter prediction) indicated by the prediction mode predMode. Here, the reference picture block is a set (this is called a block since the shape thereof is typically a rectangle) of pixels in the reference picture and is a region to be referred to for generating a prediction image.

Inter Prediction Image Generation Unit 309

Here, in a case that the prediction mode predMode indicates the inter prediction mode, the inter prediction image generation unit 309 generates a prediction image of a block or a sub-block through inter prediction using inter prediction parameters input from the inter prediction parameter decoder 303 and a reference picture.

Motion Compensation

A motion compensation unit 3091 (interpolated image generation unit) generates an interpolated image (motion compensation image) by reading a block located at a position shifted by the amount of a motion vector mvLX starting from a position of a target block in a reference picture RefLX designated by a reference picture index refIdxLX from the reference picture memory 306 based on the inter prediction parameters (a prediction list utilization flag predFlagLX, the reference picture index refIdxLX, and the motion vector mvLX) input from the inter prediction parameter decoder 303. Here, in a case that precision of the motion vector mvLX is not integer precision, the motion compensation image is generated by applying a filter to generate pixels at decimal positions, which is called motion compensation filter.

First, the motion compensation unit 3091 derives the integer position (xInt, yInt) corresponding to the intra-prediction-block coordinates (x, y) and a phase (xFrac, yFrac) by the following equations.

$$xInt=xPb+(mvLX[0]>>(\log 2(MVBIT)))+x$$

$$xFrac=mvLX[0]\&(MVBIT-1)$$

$$yInt=yPb+(mvLX[1]>>(\log 2(MVBIT)))+y$$

$$yFrac=mvLX[1]\&(MVBIT-1)$$

Here, (xPb, yPb) denotes the upper left coordinates of the block with a size of wPb*hPb, where x=0, . . . , wPb−1, y=0, . . . , hPb−1, and MVBIT denotes precision (1/MVBIT pixel precision) of the motion vector mvLX.

The motion compensation unit 3091 derives a temporary image temp[ ][ ] through horizontal interpolation processing on the reference picture refImg using an interpolation filter. Σ satisfies k=0 below. The sum related to k in NTAP−1, or shift1 is a normalization parameter to adjust a range of a value, where offset1=1<<(shift1−1).

$$temp[x][y]=(\Sigma mcFilter[xFrac][k]*refImg[xInt+k-NTAP/2+1][yInt]+offset1)>>shift1$$

Next, the motion compensation unit 3091 derives the interpolated image Pred[ ][ ] through vertical interpolation processing performed on the temporary image temp[ ][ ], I satisfies k=0 below. The sum related to k in NTAP−1, or shift2 is a normalization parameter to adjust a range of a value, where offset2=1<<(shift2−1).

$$Pred[x][y]=(\Sigma mcFilter[yFrac][k]*temp[x][y+k-NTAP/2+1]+offset2)>>shift2$$

Note that in a case of bi-prediction, Pred[ ][ ] described above is derived for each of the L0 list and the L1 list (which will be referred to as interpolated images PredL0[ ][ ] and PredL1[ ][ ]) and the interpolated image Pred[ ][ ] is generated from the interpolated image PredL0[ ][ ] and the interpolated image PredL1[ ][ ], Weight Prediction A weight prediction unit 3094 generates a prediction image of a block by multiplying the motion compensation image PredLX by a weight coefficient. In a case that one of the prediction list utilization flags (predFlagL0 or predFlagL1) is 1 (uni-prediction) and weight prediction is not to be used, processing of the following equation to cause the motion compensation image PredLX (LX is L0 or L1) to conform to the pixel bit number bitDepth is performed.

$$Pred[x][y]=Clip3(0,(1<<bitDepth)-1,(PredLX[x][y]+offset1)>>shift1)$$

Here, shift1=14-bitDepth, and offset1=1<<(shift1−1).

Also, in a case that both the reference list utilization flags (predFlagL0 and predFlagL1) are 1 (bi-prediction BiPred) and weight prediction is not to be used, processing of the following equation to average the motion interpolated images PredL0 and predL1 for conformity to the pixel bit number is performed.

$$Pred[x][y]=Clip3(0,(1<<bitDepth)-1,(PredL0[x][y]+PredL1[x][y]+offset2)>>shift2)$$

Here, shift2=15-bitDepth, and offset2=1<<(shift2−1).

Further, in a case that uni-prediction and weight prediction are performed, the weight prediction unit 3094 derives a weight prediction coefficient w0 and an offset o0 from coded data and performs processing of the following equation.

$$Pred[x][y]=Clip3(0,(1<<bitDepth)-1,((PredLX[x][y]*w0+2<<(\log 2WD-1))>>\log 2WD)+o0)$$

Here, log 2WD is a variable indicating a predetermined amount of shift.

Further, in a case that bi-prediction BiPred and weight prediction are performed, the weight prediction unit 3094 derives weight prediction coefficients w0, w1, o0, and o1 from coded data and performs processing of the following equation.

$$Pred[x][y]=Clip3(0,(1<<bitDepth)-1,(PredL0[x][y]*w0+PredL1[x][y]*w1+((o0+o1+1)<<\log 2WD))>>(\log 2WD+1))$$

The inter prediction image generation unit 309 outputs the generated prediction image of the block to the addition unit 312.

Intra Prediction Image Generation Unit 310

In a case that the prediction mode predMode indicates the intra prediction mode, the intra prediction image generation unit 310 performs intra prediction using intra prediction parameters input from the intra prediction parameter decoder 304 and reference pixels read from the reference picture memory 306.

Specifically, the intra prediction image generation unit 310 reads, from the reference picture memory 306, adjacent blocks within a predefined range from a target block in a target picture. The predefined range includes adjacent blocks on the left, upper left, upper, and upper right sides of the target block, and a region to be referred to differs depending on the intra prediction mode.

The intra prediction image generation unit 310 generates a prediction image of the target block with reference to a read decoded pixel value and a prediction mode indicated by the intra prediction mode IntraPredMode. The intra prediction image generation unit 310 outputs the generated prediction image to the addition unit 312.

The inverse quantization and inverse transform unit 311 performs inverse quantization on a quantization transform coefficient input from the entropy decoder 301 to obtain a transform coefficient. The quantization transform coefficient is a coefficient obtained by performing frequency transform, such as a discrete cosine transform (DCT), a discrete sine transform (DST), or a Karyhnen Loeve transform (KLT), on a prediction error to quantize the error in coding processing. The inverse quantization and inverse transform unit 311 performs inverse frequency transform, such as an inverse DCT, an inverse DST, or an inverse KLT, on the obtained transform coefficient to calculate a prediction error. The inverse quantization and inverse transform unit 311 outputs the prediction error to the addition unit 312.

The addition unit 312 adds the prediction image of the block input from the prediction image generation unit 308 and the prediction error input from the inverse quantization and inverse transform unit 311 for each pixel to generate a decoded image of the block. The addition unit 312 stores the decoded image of the block in the reference picture memory 306 and outputs the decoded image to the loop filter 305.

Configuration of Video Coding Apparatus

Figure 15:
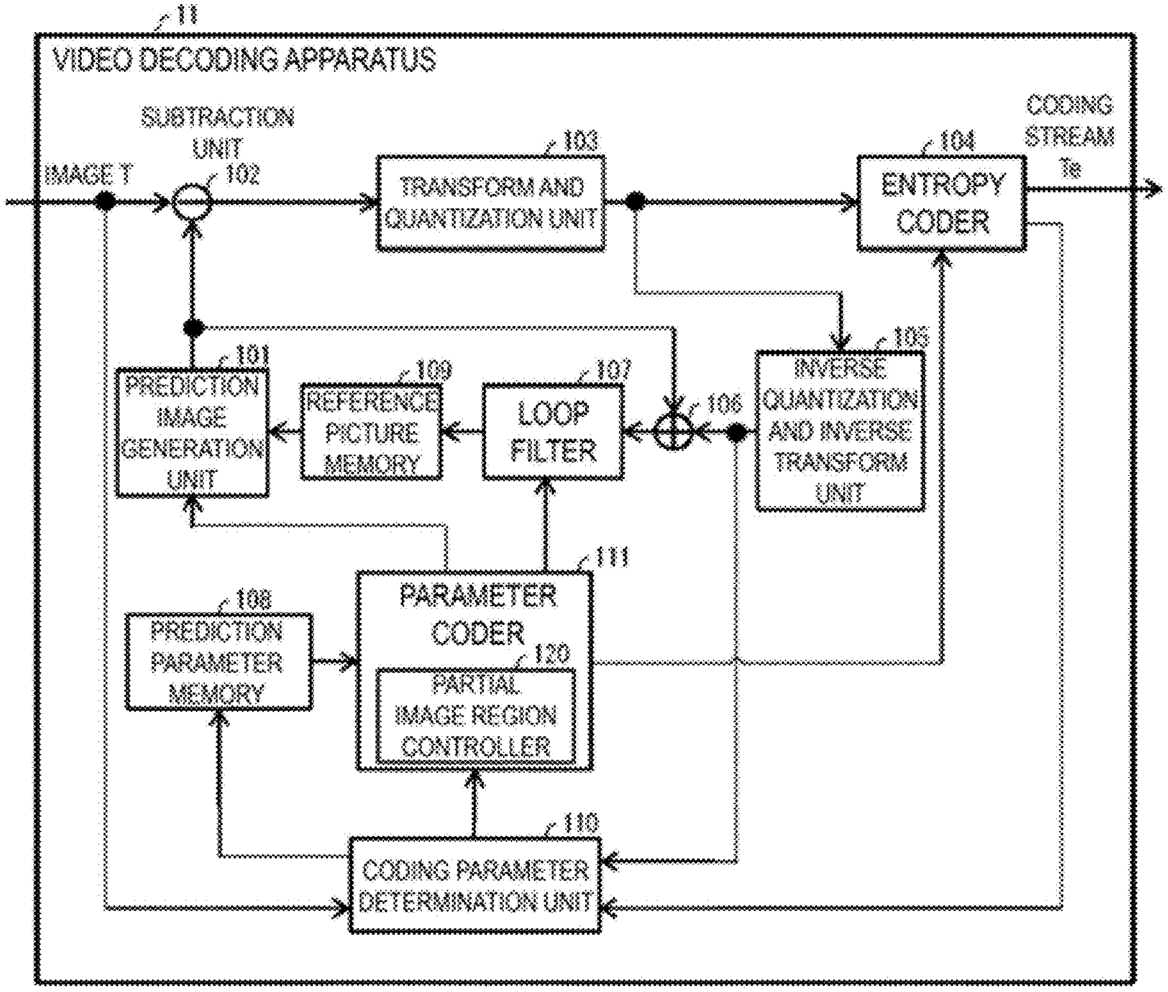
FIG. 15 is a block diagram illustrating a configuration of a video coding apparatus, in accordance with one or more example implementations of this disclosure.

Next, a configuration of the video coding apparatus 11 according to the present embodiment will be described. FIG. 15 is a block diagram illustrating a configuration of a video coding apparatus 11, in accordance with one or more example implementations of this disclosure. The video coding apparatus 11 is configured to include a prediction image generation unit 101, a subtraction unit 102, a transform and quantization unit 103, an inverse quantization and inverse transform unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, and an entropy coder 104.

The prediction image generation unit 101 generates a prediction image for each CU that is a region obtained by splitting each picture of an image T. The prediction image generation unit 101 performs the same operations as those of the prediction image generation unit 308 which has already been described, and description thereof will be omitted.

The subtraction unit 102 generates a prediction error by subtracting, from a pixel value of the image T, a pixel value of the prediction image of the block input from the prediction image generation unit 101. The subtraction unit 102 outputs the prediction error to the transform and quantization unit 103.

The transform and quantization unit 103 calculates a transform coefficient through frequency transform performed on the prediction error input from the subtraction unit 102 and derives a quantization transform coefficient through quantization. The transform and quantization unit 103 outputs the quantization transform coefficient to the entropy coder 104 and the inverse quantization and inverse transform unit 105.

The inverse quantization and inverse transform unit 105 is the same as the inverse quantization and inverse transform unit 311 (shown in FIG. 14) in the video decoding apparatus 31, and description thereof will be omitted. The calculated prediction error is output to the addition unit 106.

The parameter coder 111 is configured with a partial image region controller 120, and an inter prediction parameter coder 112 and an intra prediction parameter coder 113, which are not illustrated in the drawing.

The partial image region controller 120 includes a header coder 1110, a CT information coder 1111, a CU coder 1112 (prediction mode coder), and an inter prediction parameter coder 112 and an intra prediction parameter coder 113, which are not illustrated in the drawing. The CU coder 1112 further includes a TU coder 1114.

Hereinafter, overview operations of each module will be described. The parameter coder 111 performs processing of coding header information, split information, prediction information, and parameters, such as quantization transform coefficient.

The CT information coder 1111 codes QT and MT (BT, TT) split information and the like from coded data.

The CU coder 1112 codes CU information, prediction information, a TU splitting flag split_transform_flag, a CU residual flags cbf_cb, cbf_cr, and cbf_luma, and the like.

The TU coder 1114 codes QP update information (quantization correction value) and a quantization prediction error (residual_coding) in a case that a TU includes a prediction error.

The entropy coder 104 transforms the syntax elements supplied from a supply source into binary data, generates coded data by an entropy coding scheme, such as CABAC, and outputs the coded data. The supply source of the syntax elements is the CT information coder 1111 and the CU coder 1112. The syntax elements include inter prediction parameters (a prediction mode predMode, a merge flag merge flag, a merge index merge_idx, an inter prediction identifier inter_pred_idc, a reference picture index refIdxLX, a prediction vector index mvp_LX_idx, a difference vector mvdLX), intra prediction parameters (prev_intra_luma_pred_flag, mpm_idx, rem_selected_mode_flag, rem_selected_mode, rem_non_selected_mode), a quantization transform coefficient, and the like.

The entropy coder 104 entropy-codes the split information, the prediction parameters, the quantization transform coefficient, and the like to generate a coded stream Te and outputs the coded stream Te.

Configuration of Inter Prediction Parameter Coder

The inter prediction parameter coder 112 derives inter prediction parameters based on prediction parameters input from the coding parameter determination unit 110. The inter prediction parameter coder 112 partially includes the same configuration as the configuration with which the inter prediction parameter decoder 303 derives inter prediction parameters.

Configuration of Intra Prediction Parameter Coder 113

The intra prediction parameter coder 113 derives a format for coding (for example, mpm_idx, rem_intra_luma_pred_mode, and the like) from the intra prediction mode IntraPredMode input from the coding parameter determination unit 110. The intra prediction parameter coder 113 partially includes the same configuration as the configuration with which the intra prediction parameter decoder 304 derives intra prediction parameters.

The addition unit 106 adds a pixel value of a prediction image of a block input from the prediction image generation unit 101 and a prediction error input from the inverse quantization and inverse transform unit 105 for each pixel to generate a decoded image. The addition unit 106 stores the generated decoded image in the reference picture memory 109.

The loop filter 107 applies a deblocking filter, SAO, or ALF to the decoded image generated by the addition unit 106. Note that the loop filter 107 may not necessarily include the aforementioned three types of filters and may be configured only with a deblocking filter, for example.

The prediction parameter memory 108 stores the prediction parameters generated by the coding parameter determination unit 110 at a predefined position for each target picture and each CU.

The reference picture memory 109 stores the decoded image generated by the loop filter 107 at a predefined position for each target picture and each CU.

The coding parameter determination unit 110 selects one set from among multiple sets of coding parameters. The coding parameters are the aforementioned QT, BT, or TT split information, the prediction parameters, or parameters to be coded that are generated in relation to these. The prediction image generation unit 101 generates a prediction image using these coding parameters.

The coding parameter determination unit 110 calculates an RD cost value indicating how large the amount of information is and indicating a coding error for each of the multiple sets. The RD cost value is a sum of the amount of coding and a value obtained by multiplying a square error by a coefficient λ, for example. The amount of coding is the amount of information of the coded stream Te obtained by entropy-coding the quantization error and the coding parameters. The square error is a square sum of the prediction error calculated by the subtraction unit 102. The coefficient λ is a preset real number that is greater zero. The coding parameter determination unit 110 selects a set of coding parameters with which the calculated cost value is minimum. The entropy coder 104 thus outputs the selected set of coding parameters as the coded stream Te. The coding parameter determination unit 110 stores the determined coding parameters in the prediction parameter memory 108.

Note that a part of the video coding apparatus 11 and the video decoding apparatus 31 in the aforementioned embodiment, for example, the entropy decoder 301, the parameter decoder 302, the loop filter 305, the prediction image generation unit 308, the inverse quantization and inverse transform unit 311, the addition unit 312, the prediction image generation unit 101, the subtraction unit 102, the transform and quantization unit 103, the entropy coder 104, the inverse quantization and inverse transform unit 105, the loop filter 107, the coding parameter determination unit 110, and the parameter coder 111 may be realized by a computer. In that case, this configuration may be realized by recording a program for realizing such control functions on a computer-readable recording medium and causing a computer system to read and perform the program recorded on the recording medium. Note that the "computer system" mentioned here refers to a computer system built in either the video coding apparatus 11 or the video decoding apparatus 31 and is assumed to include an OS and hardware components, such as a peripheral apparatus. Furthermore, the "computer-readable recording medium" refers to a portable medium, such as a flexible disk, a magneto-optical disk, a ROM, or a CD-ROM, or a storage device, such as a hard disk built in the computer system. Moreover, the "computer-readable recording medium" may include a medium that dynamically retains a program for a short period of time, such as a communication line, in a case that the program is transmitted over a network, such as the Internet, or over a communication line, such as a telephone line, and may also include a medium that retains the program for a specific period of time, such as a volatile memory included in a computer system functioning as a server or a client in such a case. Furthermore, the aforementioned program may be one for realizing some of the aforementioned functions, and also may be one capable of realizing the aforementioned functions in combination with a program that has already been recorded in a computer system.

A video decoding apparatus according to an aspect of the present invention includes: a picture splitting unit configured to split a picture into a partial image region and a non-partial image region including any one of a CTU, a CTU column, and a CTU row as a minimum unit; and a prediction image generation unit configured to generate a prediction image, in which the prediction image generation unit uses, on a block included in the partial image region, intra prediction and loop filter processing referring only to decoded pixels in the partial image region in the picture or inter prediction referring to the partial image region of the reference picture of the picture, and uses, on a block in the non-partial image region, intra prediction and loop filter processing referring to decoded pixels in the picture or inter prediction referring to the reference picture of the picture, and the video decoding apparatus decodes the picture and then configures the partial image region of the picture as a partial image region of the reference picture.

A video decoding apparatus according to an aspect of the present invention includes: a picture splitting unit configured to split a picture into a partial image region and a non-partial image region including any one of a CTU, a CTU column, and a CTU row as a minimum unit; and a prediction image generation unit configured to generate a prediction image, in which the prediction image generation unit refers to information indicating whether or not the picture is randomly accessible, and the video decoding apparatus decodes the picture using, on a block included in the partial image region, intra prediction and loop filter processing referring only to decoded pixels in the partial image region in the picture in a case that the picture is randomly accessible, using, on the block included in the partial image region, the intra prediction and the loop filter processing referring only to the decoded pixels in the partial image region in the picture or the inter prediction referring to the partial image region of a reference picture of the picture in a case that the picture is not randomly accessible, and on a block included in the non-partial image region, using the intra prediction and the loop filter processing referring to the decoded pixels in the picture or the inter prediction referring to the reference picture of the picture regardless of whether or not the picture is randomly accessible, thereby configuring the partial image region of the picture as a partial image region of the reference picture.

In the video decoding apparatus according to an aspect of the present invention, the picture splitting unit splits the picture into the partial image region and the non-partial image region with reference to region information decoded from coded data.

In the video decoding apparatus according to an aspect of the present invention, the region information includes information indicating a position and a size of the partial image region.

In the video decoding apparatus according to an aspect of the present invention, refresh information is decoded, the refresh information indicating the number of pictures from the picture including information that is randomly accessible to a picture of which entirety becomes a partial image region.

A video coding apparatus according to an aspect of the present invention includes: a picture splitting unit configured to split a picture into a partial image region and a non-partial image region including any one of a CTU, a CTU column, and a CTU row as a minimum unit; and a prediction image generation unit configured to generate a prediction image, in which the prediction image generation unit configures, after the picture is coded, the partial image region of the picture as a partial image region of a reference picture using, on a block included in the partial image region, intra prediction and loop filter processing referring only to decoded pixels in the partial image region in the picture or inter prediction referring to a limited reference region of the reference picture of the picture, and using, on a block included in the non-partial image region, intra prediction and loop filter processing referring to decoded pixels in the picture or inter prediction referring to the reference picture of the picture.

A part or all of the video coding apparatus 11 and the video decoding apparatus 31 in the aforementioned embodiments may be realized as an integrated circuit, such as a large-scale integration (LSI). Functional blocks of the video coding apparatus 11 and the video decoding apparatus 31 may be individually realized as processors, or a part or all of the functional blocks may be integrated into processors. The circuit integration technique is not limited to the LSI, and the integrated circuits may be realized as dedicated circuits or a general-purpose processor. In a case that with advances in semiconductor technology, a circuit integration technology with which an LSI is replaced appears, an integrated circuit based on the technology may be used.

Although the embodiments of the present invention have been described in detail with reference to the drawings, the specific configuration is not limited to the above embodiments, and various amendments may be made to a design without departing from the gist thereof.

Application Examples

The aforementioned video coding apparatus 11 and the video decoding apparatus 31 may be mounted on and used with various apparatuses performing transmission, reception, recording, and regeneration of videos. Note that the video may be a natural video imaged by a camera or the like or may be an artificial video (including CG and GUI) generated by computer or the like.

Figure 16A:
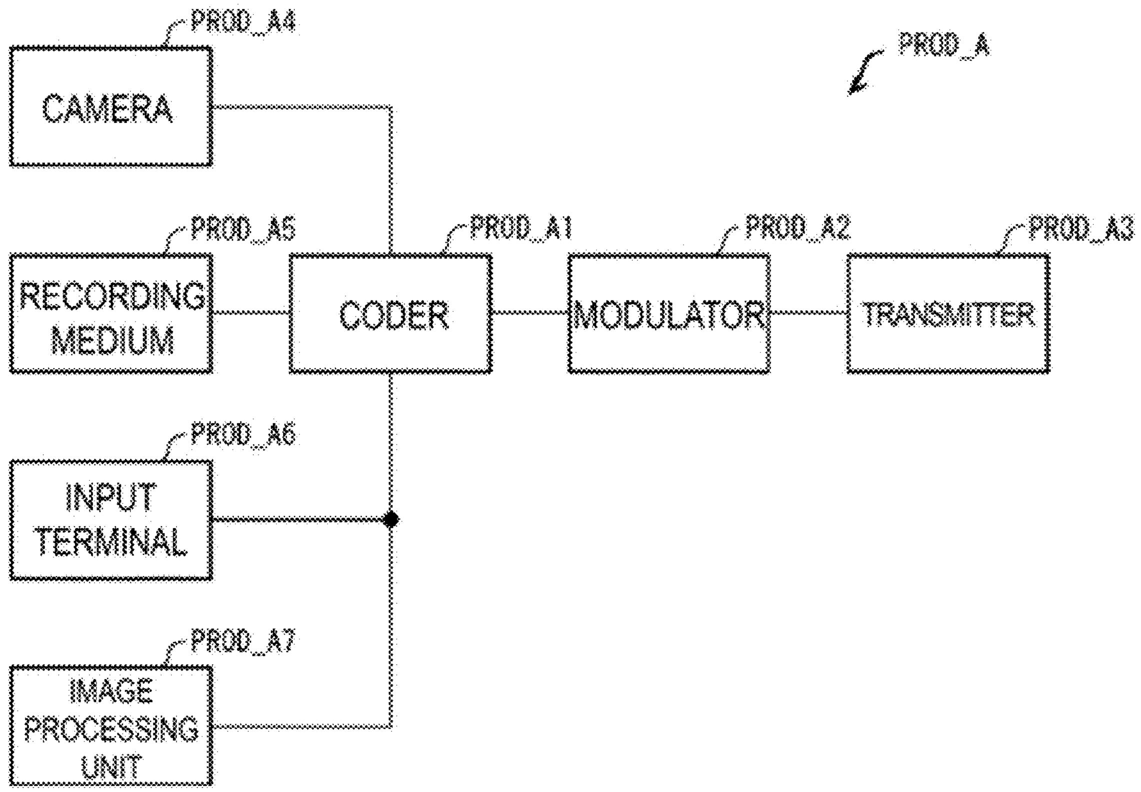
FIGS. 16A-16B are diagrams respectively illustrating configurations of a transmitting apparatus equipped with the video coding apparatus and a receiving apparatus equipped with the video decoding apparatus, in accordance with one or more example implementations of this disclosure.
Figure 16B:
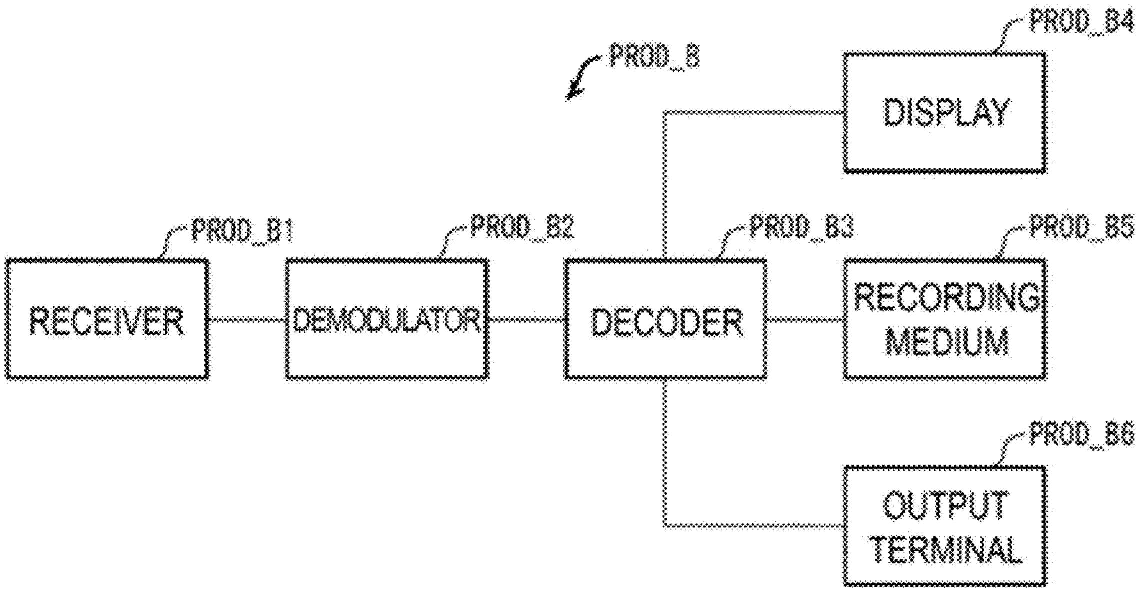

First, the fact that it is possible to use the aforementioned video coding apparatus 11 and the video decoding apparatus 31 to transmit and receive videos will be described with reference to FIGS. 16A-16B. FIGS. 16A-16B are diagrams respectively illustrating configurations of a transmitting apparatus equipped with the video coding apparatus and a receiving apparatus equipped with the video decoding apparatus, in accordance with one or more example implementations of this disclosure.

FIG. 16A is a block diagram illustrating a configuration of a transmitting apparatus PROD_A equipped with the video coding apparatus 11. As illustrated in FIG. 16A, the transmitting apparatus PROD_A includes a coder PROD_A1 which obtains coded data by coding a video, a modulator PROD_A2 which obtains a modulation signal by modulating carrier waves with the coded data obtained by the coder PROD_A1, and a transmitter PROD_A3 which transmits the modulation signals obtained by the modulator PROD_A2. The aforementioned video coding apparatus 11 is used as the coder PROD_A1.

The transmitting apparatus PROD_A may further include a camera PROD_A4 that images a video, a recording medium PROD_A5 that records the video, an input terminal PROD_A6 for inputting the video from the outside, and an image processing unit A7 which generates or processes the image, as supply sources of the video input to the coder PROD_A1. Although an example configuration in which the transmitting apparatus PROD_A includes all of the components is illustrated in FIG. 16A, some of the components may be omitted.

Note that the recording medium PROD_A5 may record videos which have not been coded or may record videos which have been coded in a coding scheme for recording that is different from a coding scheme for transmission. In the latter case, a decoder (not illustrated) to decode coded data read from the recording medium PROD_A5 in accordance with the coding scheme for recording may be interposed between the recording medium PROD_A5 and the coder PROD_A1.

FIG. 16B is a block diagram illustrating a configuration of a receiving apparatus PROD_B equipped with the video decoding apparatus 31. As illustrated in FIG. 16B, the receiving apparatus PROD_B includes a receiver PROD_B1 that receives a modulation signal, a demodulator PROD_B2 that obtains coded data by demodulating the modulation signal received by the receiver PROD_B1, and a decoder PROD_B3 that obtains a video by decoding the coded data obtained by the demodulator PROD_B2. The aforementioned video decoding apparatus 31 is used as the decoder PROD_B3.

The receiving apparatus PROD_B may further include a display PROD_B4 that displays a video, a recording medium PROD_B5 for recording the video, and an output terminal PROD_B6 for outputting the video to the outside, as supply destinations of the video output by the decoder PROD_B3. Although an example configuration in which the receiving apparatus PROD_B includes all of the components is illustrated in FIG. 16B, some of the components may be omitted.

Note that the recording medium PROD_B5 may record videos which have not been coded, or may record videos which have been coded in a coding scheme for recording that is different from a coding scheme for transmission. In the latter case, a coder (not illustrated) that codes videos acquired from the decoder PROD_B3 in accordance with the coding scheme for recording may be interposed between the decoder PROD_B3 and the recording medium PROD_B5.

Note that a transmission medium for transmitting modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (such as a broadcasting equipment)/receiving station (such as a television receiver) for digital terrestrial broadcasting is an example of the transmitting apparatus PROD_A/receiving apparatus PROD_B for transmitting and/or receiving the modulation signals in the wireless broadcast. In addition, a broadcasting station (such as a broadcasting equipment)/receiving station (such as a television receiver) for cable television broadcasting is an example of the transmitting apparatus PROD_A/receiving apparatus PROD_B for transmitting and/or receiving the modulation signals in the wired broadcast.

In addition, a server (such as a workstation)/client (such as a television receiver, a personal computer, or a smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, the personal computer includes a desktop PC, a laptop PC, and a tablet PC. In addition, a smartphones also include a multi-functional mobile telephone terminal.

A client of a video hosting service has a function of coding a video imaged with a camera and uploading the video to a server, in addition to a function of decoding coded data downloaded from a server and displaying on a display. Thus, the client of the video hosting service functions both as the transmitting apparatus PROD_A and as the receiving apparatus PROD_B.

Figure 17A:
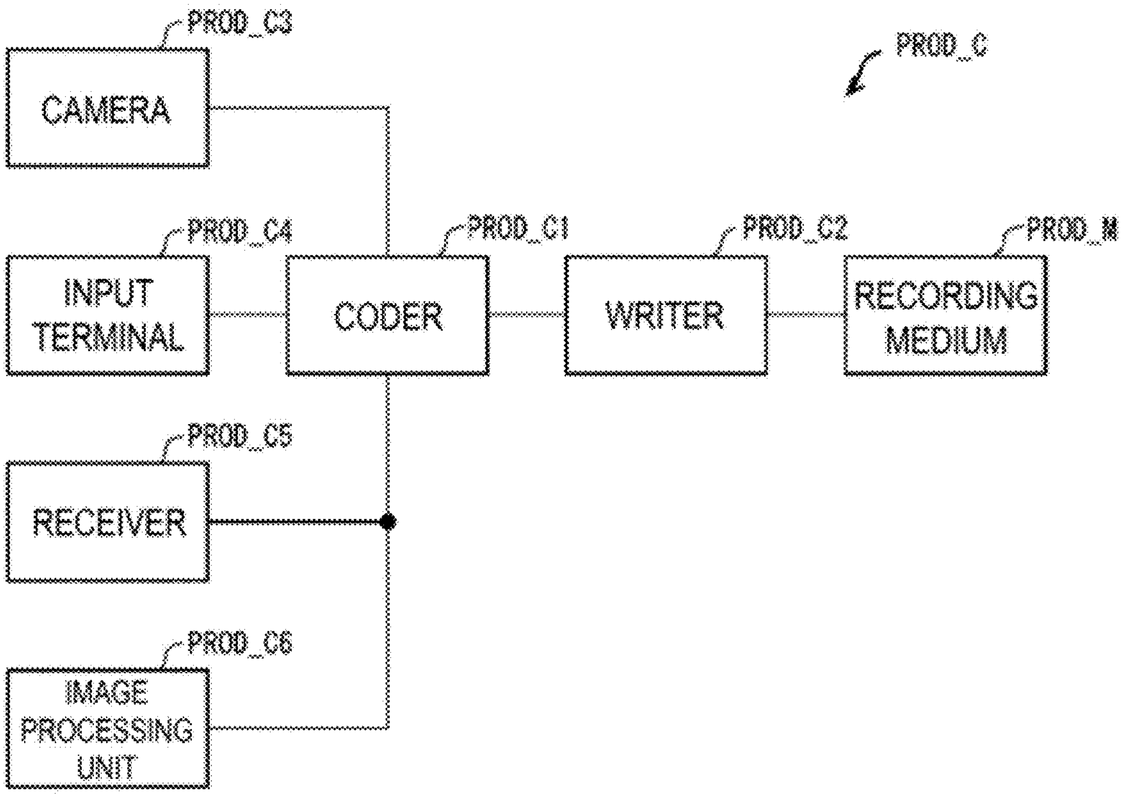
FIGS. 17A-17B are diagrams respectively illustrating configurations of a recording apparatus equipped with the video coding apparatus and a reconstruction apparatus equipped with the video decoding apparatus, in accordance with one or more example implementations of this disclosure.
Figure 17B:
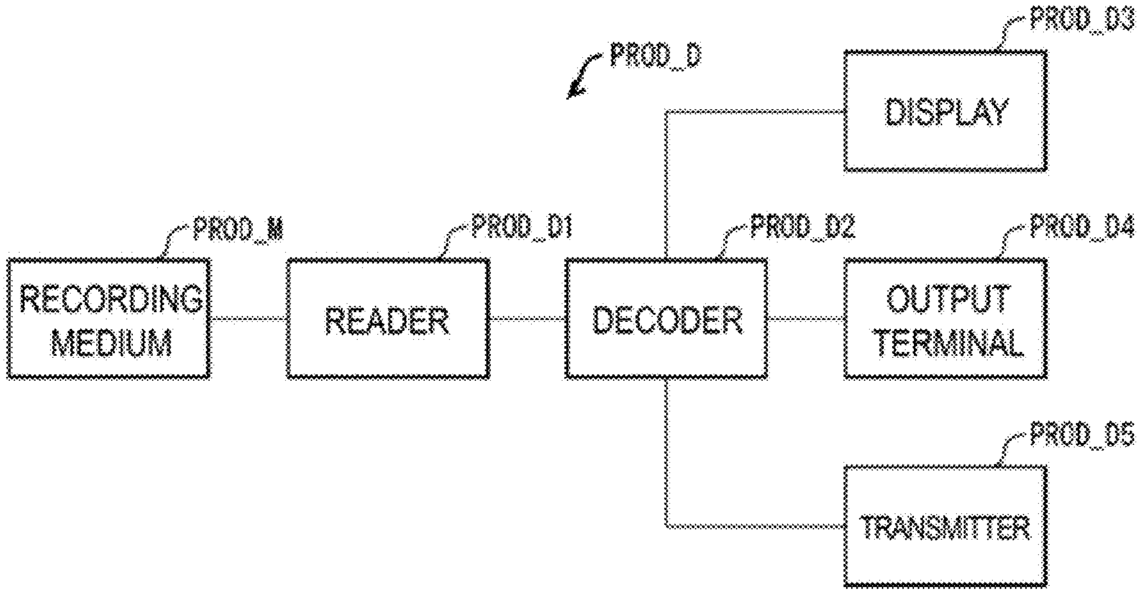

Next, the fact that it is possible to use the aforementioned video coding apparatus 11 and the video decoding apparatus 31 to record and reconstruct a video will be described with reference to FIGS. 17A-17B. FIGS. 17A-17B are diagrams respectively illustrating configurations of a recording apparatus equipped with the video coding apparatus and a reconstruction apparatus equipped with the video decoding apparatus, in accordance with one or more example implementations of this disclosure.

FIG. 17A is a block diagram illustrating a configuration of a recording apparatus PROD_C equipped with the aforementioned video coding apparatus 11. As illustrated in the drawing, the recording apparatus PROD_C includes a coder PROD_C1 that obtains coded data by coding a video and a writer PROD_C2 that writes the coded data obtained by the coder PROD_C1 in a recording medium PROD_M. The aforementioned video coding apparatus 11 is used as the coder PROD_C1.

Note that the recording medium PROD_M may be (1) a type of recording medium built in the recording apparatus PROD_C, such as a hard disk drive (HDD) or a solid state drive (SSD), may be (2) a type of recording medium connected to the recording apparatus PROD_C, such as an SD memory card or a universal serial bus (USB) flash memory, or may be (3) a type of recording medium loaded in a drive apparatus (not illustrated) built in the recording apparatus PROD_C, such as Digital Versatile Disc (DVD: trade name) or a Blue-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input to the coder PROD_C1. Although an example configuration in which the recording apparatus PROD_C includes all of the components is illustrated in the drawing, some of the components may be omitted.

Note that the receiver PROD_C5 may receive a video which has not been coded or may receive coded data which has been coded in a coding scheme for transmission that is different from the coding scheme for recording. In the latter case, a decoder for transmission (not illustrated) that decodes coded data which has been coded in the coding scheme for transmission may be interposed between the receiver PROD_C5 and the coder PROD_C1.

Examples of such a recording apparatus PROD_C include a DVD recorder, a BD recorder, a hard disk drive (HDD) recorder, and the like (in this case, the input terminal PROD_C4 or the receiver PROD_C5 serves as a main supply source of videos). In addition, a camcorder (in this case, the camera PROD_C3 serves as a main supply source of videos), a personal computer (in this case, the receiver PROD_C5 or the image processing unit C6 serves as a main supply source of videos), a smartphone (in this case, the camera PROD_C3 or the receiver PROD_C5 serves as a main supply source of videos), or the like is an example of such a recording apparatus PROD_C as well.

FIG. 17B is block illustrating a configuration of a reconstruction apparatus PROD_D equipped with the aforementioned video decoding apparatus 31. As illustrated in the drawing, the reconstruction apparatus PROD_D includes a reader PROD_D1 which reads coded data written in the recording medium PROD_M and a decoder PROD_D2 which obtains a video by decoding the coded data read by the reader PROD_D1. The aforementioned video decoding apparatus 31 is used as the decoder PROD_D2.

Note that the recording medium PROD_M may be (1) a type of recording medium built in the reconstruction apparatus PROD_D, such as an HDD or an SSD, may be (2) a type of recording medium connected to the reconstruction apparatus PROD_D, such as an SD memory card or a USB flash memory, or may be (3) a type of recording medium loaded in a drive apparatus (not illustrated) built in the reconstruction apparatus PROD_D, such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as supply destinations of the video output by the decoder PROD_D2. Although an example configuration in which the reconstruction apparatus PROD_D includes all of the components is illustrated in the drawing, some of the components may be omitted.

Note that the transmitter PROD_D5 may transmit a video which has not been coded or may transmit coded data which has been coded in a coding scheme for transmission that is different from a coding scheme for recording. In the latter case, a coder (not illustrated) that codes a video in the coding scheme for transmission may be interposed between the decoder PROD_D2 and the transmitter PROD_D5.

Examples of such a reconstruction apparatus PROD_D include, for example, a DVD player, a BD player, an HDD player, and the like (in this case, the output terminal PROD_D4 to which a television receiver or the like is connected serves as a main supply destination of videos). In addition, a television receiver (in this case, the display PROD_D3 serves as a main supply destination of videos), a digital signage (this is also referred to as an electronic signboard, an electronic bulletin board, or the like, and the display PROD_D3 or the transmitter PROD_D5 serves as a main supply destination of videos), a desktop PC (in this case, the output terminal PROD_D4 or the transmitter PROD_D5 serves as a main supply destination of videos), a laptop or tablet PC (in this case, the display PROD_D3 or the transmitter PROD_D5 serves as a main supply destination of videos), a smartphone (in this case, the display PROD_D3 or the transmitter PROD_D5 serves as a main supply destination of videos), or the like is an example of the reconstruction apparatus PROD_D.

Realization by Hardware and Realization by Software

Each block of the aforementioned video decoding apparatus 31 and the video coding apparatus 11 may be realized as hardware using a logical circuit formed on an integrated circuit (IC chip) or may be realized as software using a central processing unit (CPU).

In the latter case, each apparatus includes a CPU performing a command of a program to implement each function, a read-only memory (ROM) storing the program, a random-access memory (RAM) in which the program is deployed, and a storage apparatus (recording medium), such as a memory storing the program and various kinds of data, and the like. In addition, an object of the embodiments of the present invention may also be achieved by supplying, to each of the apparatuses, a recording medium that records, in a computer-readable form, program codes of a control program (executable program, intermediate code program, source program) of each of the apparatuses that is software for realizing the aforementioned functions and by reading and executing, by the computer (or a CPU or an MPU), the program codes recorded in the recording medium.

As the recording medium, for example, tapes including a magnetic tape, a cassette tape, and the like, discs including a magnetic disk, such as a floppy (trade name) disk/a hard disk and an optical disc, such as a compact disc read-only memory (CD-ROM)/a magneto-optical disc (MO disc)/a mini disc (Md)/a Digital Versatile Disc(DVD; trade name)/a CD recordable (CD-R)/a Blu-ray (trade name) disc (trade name), cards, such as an IC card (including a memory card)/an optical card, semiconductor memories, such as a mask ROM/an erasable programmable read-only memory (EPROM)/an Electrically Erasable and Programmable Read-Only Memory (EEPROM: trade name)/a flash ROM, logical circuits, such as a programmable logic device (PLD) and a field-programmable gate array (FPGA), or the like may be used.

In addition, each of the apparatuses may be configured to be connectable to a communication network, and the program codes may be supplied through the communication network. The communication network may be any communication network as long as it is possible to transmit the program codes and is not particularly limited. For example, the Internet, an intranet, an extranet, a local area network (LAN), an integrated services digital network (ISDN), a value-added network (VAN), a community antenna television/cable television (CATV) communication network, a virtual private network, a telephone network, a mobile communication network, a satellite communication network, and the like are available. In addition, a transmission medium constituting this communication network may be any transmission medium as long as it is possible to transmit the program codes and is not limited to one with a specific configuration or of a specific type. For example, a wired transmission medium, such as Institute of Electrical and Electronic Engineers (IEEE) 1394, a USB, a power-line carrier, a cable TV line, a telephone line, an asymmetric digital subscriber line (ADSL), and a wireless transmission medium, such as infrared-ray of infrared data association (IrDA) or a remote control, BlueTooth (trade name), IEEE 802.11 wireless communication, high data rate (HDR), near-field communication (NFC), Digital Living Network Alliance (DLNA: trade name), a cellular telephone network, a satellite channel, a terrestrial digital broadcast network are available. Note that the embodiments of the present invention may be also realized in the form of computer data signals embedded in carrier waves such that the transmission of the program codes is embodied in electronic transmission.

The embodiments of the present invention are not limited to the aforementioned embodiments, and various modifications are possible within the scope of the claims. In other words, embodiments obtained by combining technical means modified appropriately within the scope defined by claims are included in the technical scope of the present invention as well.

INDUSTRIAL APPLICABILITY

The embodiments of the present invention may be suitably applied to a video decoding apparatus that decodes coded data obtained by coding image data and a video coding apparatus that generates coded data obtained by coding image data. It is possible to suitably apply the embodiments of the present invention to a data structure of a coded data generated by a video coding apparatus and referred to by the video decoding apparatus.

CROSS-REFERENCE OF RELATED APPLICATION

This application claims the benefit of priority to JP 2018-160712 filed on Aug. 29, 2018, which is incorporated herein by reference in its entirety.

REFERENCE SIGNS LIST

31 Image decoding apparatus
301 Entropy decoder
302 Parameter decoder
3020 Header decoder
303 Inter prediction parameter decoder
304 Intra prediction parameter decoder
308 Prediction image generation unit
309 Inter prediction image generation unit
310 intra prediction image generation unit
311 Inverse quantization and inverse transform unit
312 Addition unit
320 Partial image region controller
11 Image coding apparatus
101 Prediction image generation unit
102 Subtraction unit
103 Transform and quantization unit
104 Entropy coder
105 Inverse quantization and inverse transform unit
107 Loop filter
110 Coding parameter determination unit
111 Parameter coder
112 Inter prediction parameter coder
113 Intra prediction parameter coder
120 Partial image region controller
1110 Header coder
1111 CT information coder
1112 CU coder (prediction mode coder)
1114 TU coder

What is claimed is:

1. A method for encoding a set of pictures for gradual refresh, the method comprising:
identifying a first picture in the set of pictures as being associated with a gradual refreshed picture;
storing a network abstraction layer (NAL) unit type in a coded stream associated with the first picture, the NAL unit type identifying a presence of the gradual refreshed picture; and
storing, in the coded stream, an enable flag to identify a use of the gradual refresh for encoding at least a subset of pictures in the set of pictures.

2. The method of claim 1, wherein the enable flag is stored in a sequence parameter set (SPS) of the coded stream associated with the first picture.

3. The method of claim 1, further comprising storing, in the coded stream, a picture number determined from the gradual refreshed picture to a picture that is entirely decoded correctly.

4. The method of claim 1, wherein the NAL unit type identifying the presence of the gradual refreshed picture is stored in a NAL unit of the coded stream.

5. The method of claim 1, wherein the coded stream includes the encoded set of pictures including the first picture.

6. The method of claim 1, wherein the subset of pictures comprises the first picture.

7. The method of claim 1, wherein the subset of pictures comprises one or more pictures after the first picture in the set of pictures.

8. The method of claim 1, wherein the subset of pictures comprises one or more pictures after the first picture in the set of pictures, the method further comprising storing, in the coded stream, the one or more pictures after the first picture.

9. The method of claim 8, wherein the one or more pictures after the first picture specify pictures that need to be processed after the first picture to completely encode the gradual refreshed picture.

10. The method of claim 9, wherein a parameter encoder of a video encoder uses the NAL unit type to identify the presence of the gradual refreshed picture, and uses the stored one or more pictures after the first picture to identify the pictures that need to be processed after the first picture to completely encode the gradual refreshed picture.

11. The method of claim 8, wherein storing the one or more pictures after the first picture comprises storing the one or more pictures after the first picture in a NAL unit parameter set of the coded stream associated with the first picture.

12. The method of claim 11, wherein the NAL unit parameter set is a sequence parameter set (SPS) of the coded stream associated with the first picture.

13. An electronic device for encoding a set of pictures for gradual refresh, the electronic device comprising:
at least one processor; and
one or more non-transitory machine-readable media coupled to the at least one processor and storing one or more machine-executable instructions that, when executed by the at least one processor, cause the electronic device to:
identify a first picture in the set of pictures as being associated with a gradual refreshed picture;
store a network abstraction layer (NAL) unit type in a coded stream associated with the first picture, the NAL unit type identifying a presence of the gradual refreshed picture; and
store, in the coded stream, an enable flag to identify a use of the gradual refresh for encoding at least a subset of pictures in the set of pictures.

14. The electronic device according to claim 13, wherein the enable flag is stored in a sequence parameter set (SPS) of the coded stream associated with the first picture.

15. The electronic device according to claim 13, wherein the one or more machine-executable instructions, when executed by the at least one processor, further cause the electronic device to:
store, in the coded stream, a picture number determined from the gradual refreshed picture to a picture that is entirely decoded correctly.

16. The electronic device according to claim 13, wherein the NAL unit type identifying the presence of the gradual refreshed picture is stored in a NAL unit of the coded stream.

17. The electronic device according to claim 13, wherein:
the subset of pictures comprises one or more pictures after the first picture in the set of pictures, and
the one or more machine-executable instructions, when executed by the at least one processor, further cause the electronic device to:
store, in the coded stream, the one or more pictures after the first picture.

18. The electronic device according to claim 17, wherein the one or more pictures after the first picture specify pictures that need to be processed after the first picture to completely encode the gradual refreshed picture.

19. The electronic device according to claim 18, wherein a parameter encoder of a video encoder uses the NAL unit type to identify the presence of the gradual refreshed picture, and uses the stored one or more pictures after the first picture to identify the pictures that need to be processed after the first picture in order to completely encode the gradual refreshed picture.

20. The electronic device according to claim 17, wherein storing the one or more pictures after the first picture comprises storing the one or more pictures after the first picture in a NAL unit parameter set of the coded stream associated with the first picture.

* * * * *